(12) United States Patent
Sondecker et al.

(10) Patent No.: US 6,632,558 B1
(45) Date of Patent: Oct. 14, 2003

(54) BATTERY CONSTRUCTION HAVING PRESSURE RELEASE MECHANISM

(75) Inventors: George R. Sondecker, Asheboro, NC (US); Gary A. Laisy, Olmsted Township, OH (US)

(73) Assignee: Eveready Battery Company, Inc., St. Louis, MO (US)

(*) Notice: Subject to any disclaimer, the term of this patent is extended or adjusted under 35 U.S.C. 154(b) by 0 days.

(21) Appl. No.: 09/293,225

(22) Filed: Apr. 16, 1999

Related U.S. Application Data

(60) Provisional application No. 60/102,951, filed on Oct. 2, 1998, and provisional application No. 60/097,445, filed on Aug. 21, 1998.

(51) Int. Cl.[7] .......................... H01M 2/12; H01M 10/28
(52) U.S. Cl. .................. 429/56; 429/53; 429/57; 29/623.1
(58) Field of Search .................. 429/53, 56, 57; 29/623.1

(56) References Cited

U.S. PATENT DOCUMENTS

| | | | |
|---|---|---|---|
| 2,478,798 A | 8/1949 | Williams, Jr. | |
| 2,525,436 A | 10/1950 | Williams, Jr. | |
| 3,068,313 A | 12/1962 | Daley | |
| 3,255,049 A | 6/1966 | Wolfe | |
| 3,518,125 A * | 6/1970 | Fischbach | |
| 4,175,166 A | 11/1979 | Rosansky | 429/56 |
| 4,251,602 A | 2/1981 | Beatty | 429/54 |
| 4,256,812 A | 3/1981 | Tamura et al. | 429/56 |
| 4,308,323 A | 12/1981 | Bowsky | 429/181 |
| 4,322,483 A | 3/1982 | Tune | 429/50 |
| 4,438,184 A | 3/1984 | Chenaux | 429/181 |
| 4,567,121 A | 1/1986 | Gilmour | 429/181 |
| 4,601,959 A * | 7/1986 | Romero | 429/56 |
| 4,698,282 A | 10/1987 | Mantello | 429/56 |
| 4,702,976 A | 10/1987 | Bowsky et al. | 429/181 |
| 4,707,424 A | 11/1987 | Bowsky et al. | 429/181 |
| 4,789,608 A | 12/1988 | Oswald | 429/56 |
| 4,803,136 A * | 2/1989 | Bowsky et al. | 429/56 |
| 4,842,965 A * | 6/1989 | Urushiwara et al. | 429/56 |
| 4,999,264 A | 3/1991 | Shepard, Jr. et al. | 429/171 |
| 5,042,675 A * | 8/1991 | Patterson et al. | 220/89.1 |
| 5,279,907 A | 1/1994 | Paterek et al. | 429/56 |
| 5,283,139 A | 2/1994 | Newman et al. | 429/224 |
| 5,712,058 A | 1/1998 | Malay | 429/162 |
| 6,022,635 A * | 2/2000 | O'Hara, III et al. | 429/56 |
| 6,080,505 A * | 6/2000 | Pate | 429/53 |

FOREIGN PATENT DOCUMENTS

| | | |
|---|---|---|
| EP | 217725 A1 | 4/1987 |
| FR | 2627327 | 2/1988 |
| JP | 49-51538 | 5/1974 |
| WO | WO8202117 | 6/1982 |

OTHER PUBLICATIONS

DI Can Battery Case Specification, Matsushita Battery Industrial Co., Ltd. Material Division, 1998, 4 pages. No Month.

Alkaline Cell Constructions, Jun. 1970, Union Carbide Corporation.

"An Innovative Rupture Disk Vent for Lithium Batteries" by Baylis C. Navel, BS&B Safety Systems, Inc., Abstract No. 31, 1046b Extended Abstracts Fall Meeting, Oct. 18–23, 1987, pp. 45–46.

* cited by examiner

*Primary Examiner*—Patrick Ryan
*Assistant Examiner*—Tracy Dove
(74) *Attorney, Agent, or Firm*—Russell H. Toye, Jr.

(57) ABSTRACT

An electrochemical cell constructed in accordance with the present invention includes a can for containing electrochemical materials including positive and negative electrodes and an electrolyte, the can having an open end and a closed end; a pressure relief mechanism formed in the closed end of the can for releasing internal pressure from within the can when the internal pressure becomes excessive; a first outer cover positioned on the closed end of the can to be in electrical contact therewith and to extend over the pressure relief mechanism; a second outer cover positioned across the open end of the can; and an insulator disposed between the can and the second outer cover for electrically insulating the can from the second outer cover. According to another embodiment, the second cover is dielectrically isolated from a current collector.

15 Claims, 19 Drawing Sheets

| D | | C | | AA | | AAA | |
|---|---|---|---|---|---|---|---|
| Total Vol (cc) | Int Vol (cc) | % | Total Vol (cc) | Int Vol (cc) | % | Total Vol (cc) | Int Vol (cc) | % |
| 50.38 | 44.16 | 87.7% | 23.22 | 19.37 | 83.4% | 7.43 | 6.05 | 81.4% | 3.65 | 2.67 | 73.2% |
| 48.19 | 41.48 | 86.1% | 23.30 | 18.95 | 81.3% | 7.62 | 6.12 | 80.3% | 3.44 | 2.62 | 76.2% |
| 48.36 | 40.59 | 83.9% | 23.53 | 19.09 | 81.1% | 7.20 | 5.84 | 81.1% | 3.55 | 2.66 | 74.9% |

FIG. 2A
PRIOR ART

| | D | | C | | | AA | | | AAA | |
|---|---|---|---|---|---|---|---|---|---|---|
| Total Vol (cc) | Collector Ass'y Vol (cc) | % | Total Vol (cc) | Collector Ass'y Vol (cc) | % | Total Vol (cc) | Collector Ass'y Vol (cc) | % | Total Vol (cc) | Collector Ass'y Vol (cc) | % |
| 50.38 | 2.51 | 5.0% | 23.22 | 1.72 | 7.4% | 7.43 | 0.52 | 7.0% | 3.65 | 0.32 | 8.8% |
| 48.19 | 3.43 | 7.1% | 23.30 | 2.01 | 8.6% | 7.62 | 0.50 | 6.6% | 3.44 | 0.29 | 8.4% |
| 48.36 | 3.80 | 7.9% | 23.53 | 2.05 | 8.7% | 7.20 | 0.53 | 7.4% | 3.55 | 0.30 | 8.5% |

FIG. 2B
PRIOR ART

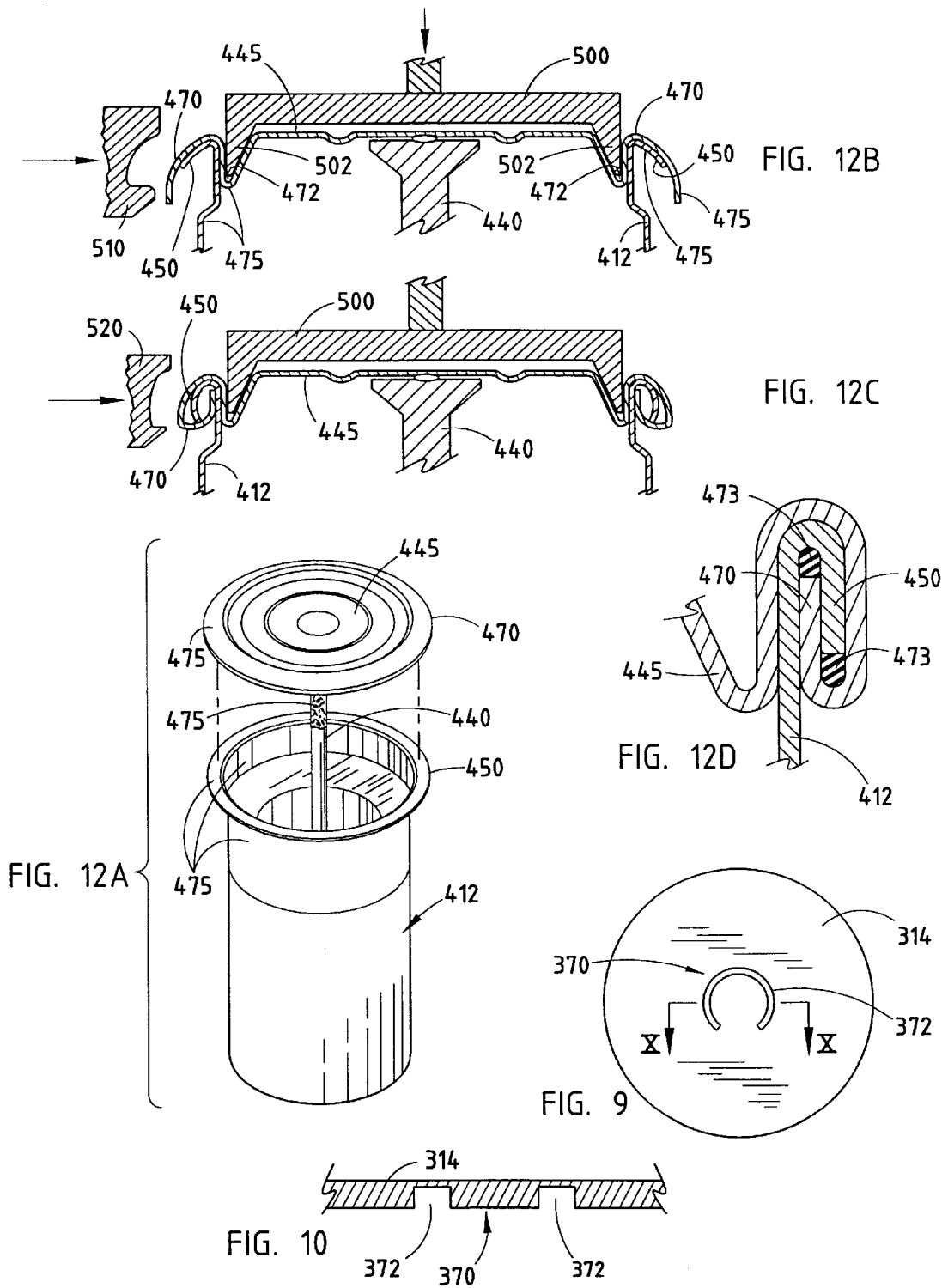

| | D | | | C* | | | AA | | | AAA | | |
|---|---|---|---|---|---|---|---|---|---|---|---|---|
| | Walls | Total Vol (cc) | Int Vol (cc) | % | Walls | Total Vol (cc) | Int Vol (cc) | % | Walls | Total Vol (cc) | Int Vol (cc) | % |
| | | | | | | | | | | | | |
| Low Profile Seal | 10 mil | 50.07 | 44.67 | 89.2% | 10 mil | 24.57 | 20.21 | 83.2% | 8 mil | 7.75 | 6.47 | 83.5% | 8 mil | 3.57 | 2.81 | 78.7% |
| Ultra Low Profile Seal | 10 mil | 50.07 | 45.53 | 90.9% | 10 mil | 24.57 | 20.92 | 85.1% | 8 mil | 7.75 | 6.56 | 84.7% | 8 mil | 3.57 | 2.90 | 81.3% |
| Ultra Low Profile Seal w/Thin Can Walls | 8 mil | 50.07 | 46.34 | 92.6% | 8 mil | 24.57 | 21.23 | 86.4% | 6 mil | 7.75 | 6.77 | 87.4% | 6 mil | 3.57 | 3.06 | 85.5% |
| Pressure Relief In Can Bottom | 10 mil | 50.07 | 46.82 | 93.5% | 10 mil | 24.57 | 21.42 | 87.2% | 8 mil | 7.75 | 6.68 | 86.2% | 8 mil | 3.57 | 3.02 | 84.6% |
| Pressure Relief In Can Bottom w/Thin Walls | 8 mil | 50.07 | 47.52 | 94.9% | 8 mil | 24.57 | 21.73 | 88.4% | 6 mil | 7.75 | 6.95 | 89.6% | 6 mil | 3.57 | 3.14 | 88.0% |
| Beverage Can-Type Construction* | 8 mil | 50.07 | 48.59 | 97.0% | 8 mil | 24.57 | 22.26 | 90.6% | 6 mil | 7.75 | 7.01 | 90.4% | 6 mil | 3.57 | 3.22 | 90.1% |
| Beverage Can With Feed Through Collector* | 8 mil | 50.07 | 48.07 | 96.0% | 8 mil | 24.57 | 22.01 | 89.6% | 6 mil | 7.75 | 6.93 | 89.4% | 6 mil | 3.57 | 3.18 | 89.1% |

\* Utilizes a lithographed label directly on the can -- all other constructions use a shrink wrap label.

\*\* All the D size cells were constructed with a recessed negative cover.

\*\*\* All the C size cells were constructed with a recessed negative cover and have a 10 mil diameter increase over the prior C size Energizer cells.

FIG. 14A

|  | D** | | | C*** | | | AA | | | AAA | | |
|---|---|---|---|---|---|---|---|---|---|---|---|---|
|  | Walls | Total Volume (cc) | Collector Ass'y Vol (cc) | % | Walls | Total Volume (cc) | Collector Ass'y Vol (cc) | % | Walls | Total Volume (cc) | Collector Ass'y Vol (cc) | % |
| Low Profile Seal | 10 mil | 50.07 | 2.65 | 5.3% | 10 mil | 24.57 | 1.81 | 7.4% | 8 mil | 7.75 | 0.36 | 4.6% | 8 mil | 3.57 | 0.24 | 6.7% |
| Ultra Low Profile Seal | 10 mil | 50.07 | 1.89 | 3.8% | 10 mil | 24.57 | 1.10 | 4.5% | 8 mil | 7.75 | 0.25 | 3.2% | 8 mil | 3.57 | 0.15 | 4.1% |
| Ultra Low Profile Seal w/Thin Can Walls | 8 mil | 50.07 | 1.70 | 3.4% | 8 mil | 24.57 | 0.97 | 3.9% | 6 mil | 7.75 | 0.19 | 2.5% | 6 mil | 3.57 | 0.12 | 3.4% |
| Pressure Relief In Can Bottom | 10 mil | 50.07 | 1.00 | 2.0% | 10 mil | 24.57 | 0.75 | 3.1% | 8 mil | 7.75 | 0.13 | 1.6% | 8 mil | 3.57 | 0.06 | 1.7% |
| Pressure Relief In Can Bottom w/Thin Walls | 8 mil | 50.07 | 1.00 | 2.0% | 8 mil | 24.57 | 0.75 | 3.1% | 6 mil | 7.75 | 0.13 | 1.6% | 6 mil | 3.57 | 0.06 | 1.7% |
| Beverage Can-Type Construction* | 8 mil | 50.07 | 0.78 | 1.6% | 8 mil | 24.57 | 0.63 | 2.6% | 6 mil | 7.75 | 0.07 | 0.9% | 6 mil | 3.57 | 0.06 | 1.6% |
| Beverage Can With Feed Through Collector* | 8 mil | 50.07 | 1.30 | 2.6% | 8 mil | 24.57 | 0.88 | 3.6% | 6 mil | 7.75 | 0.15 | 1.9% | 6 mil | 3.57 | 0.09 | 2.6% |

\* Utilizes a lithographed label directly on the can -- all other constructions use a shrink wrap label.

\*\* All the D size cells were constructed with a recessed negative cover.

\*\*\* All the C size cells were constructed with a recessed negative cover and have a 10 mil diameter increase over the prior C size Energizer cells.

FIG. 14B

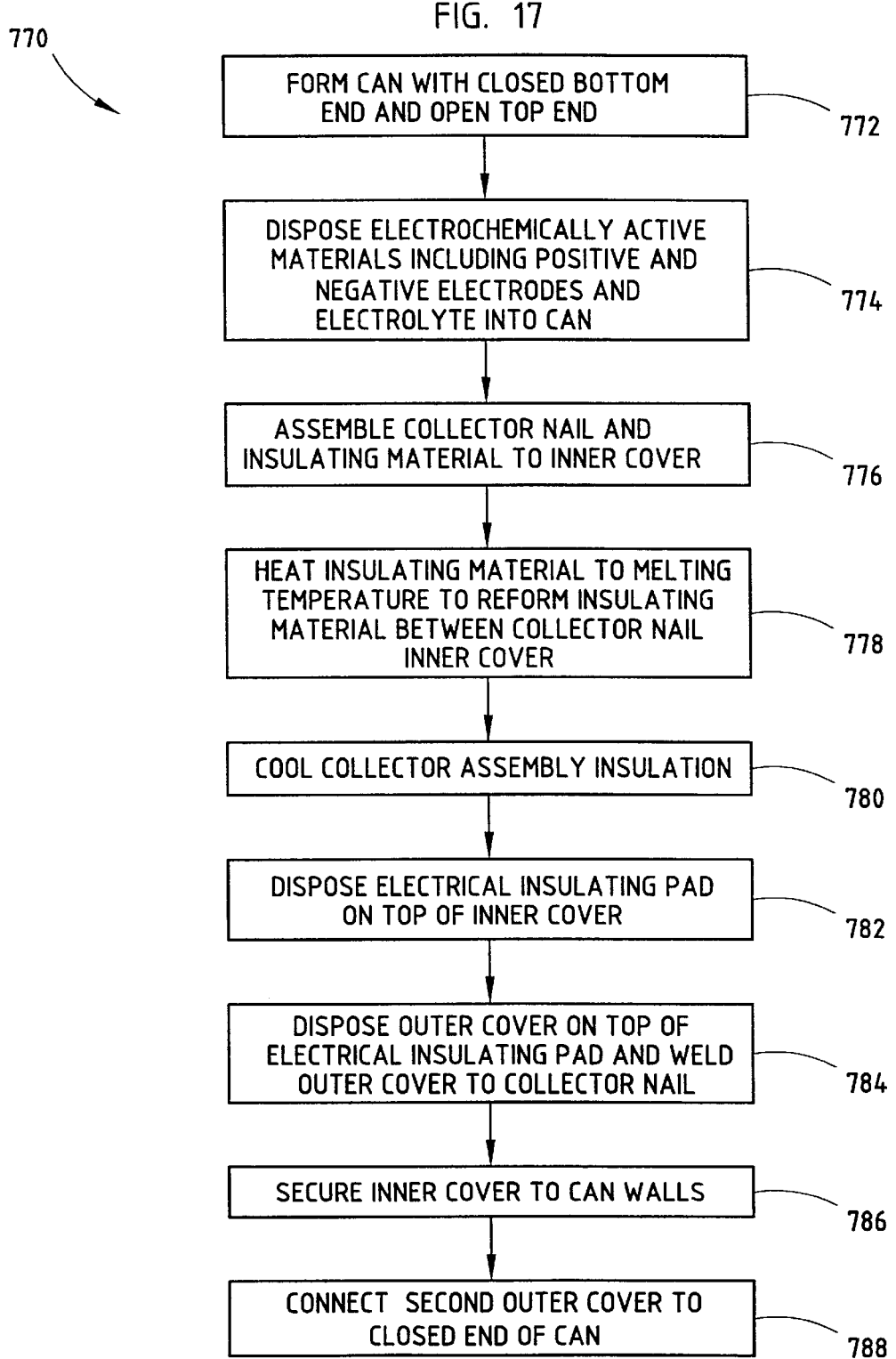

BATTERY CONSTRUCTION HAVING PRESSURE RELEASE MECHANISM

CROSS-REFERENCE TO RELATED APPLICATIONS

This application claims the benefit of U.S. Provisional Application No. 60/102,951, filed Oct. 2, 1998, and U.S. Provisional Application No. 60/097,445, filed Aug. 21, 1998.

BACKGROUND OF THE INVENTION

The present invention generally relates to an electrochemical cell construction. More particularly, the present invention relates to the containers and collector assemblies used for an electrochemical cell, such as an alkaline cell.

FIG. 1 shows the construction of a conventional C sized alkaline cell 10. As shown, cell 10 includes a cylindrically-shaped can 12 having an open end and a closed end. Can 12 is preferably formed of an electrically conductive material, such that an outer cover 11 welded to a bottom surface 14 at the closed end of can 12 serves as an electrical contact terminal for the cell.

Cell 10 further typically includes a first electrode material 15, which may serve as the positive electrode (also known as a cathode). The first electrode material 15 may be preformed and inserted into can 12, or may be molded in place so as to contact the inner surfaces of the can 12. For an alkaline cell, first electrode material 15 will typically include MnO2. After the first electrode 15 has been provided in can 12, a separator 17 is inserted into the space defined by first electrode 15. Separator 17 is preferably a non-woven fabric. Separator 17 is provided to maintain a physical separation of the first electrode material 15 and a mixture of electrolyte and a second electrode material 20 while allowing the transport of ions between the electrode materials.

Once separator 17 is in place within the cavity defined by first electrode 15, an electrolyte is dispensed into the space defined by separator 17, along with the mixture 20 of electrolyte and a second electrode material, which may be the negative electrode (also known as the anode). The electrolyte/second electrode mixture 20 preferably includes a gelling agent. For a typical alkaline cell, mixture 20 is formed of a mixture of an aqueous KOH electrolyte and zinc, which serves as the second electrode material. Water and additional additives may also be included in mixture 20.

Once the first electrode 15, separator 17, the electrolyte, and mixture 20 have been formed inside can 12, a preassembled collector assembly 25 is inserted into the open end of can 12. Can 12 is typically slightly tapered at its open end. This taper serves to support the collector assembly in a desired orientation prior to securing it in place. After collector assembly 25 has been inserted, an outer cover 45 is placed over collector assembly 25. Collector assembly 25 is secured in place by radially squeezing the can against collector assembly 25. The outer cover 45 is then placed over and in contact with collector assembly 25. The end edge 13 of can 12 is then crimped over the peripheral lip of collector assembly 25, thereby securing outer cover 45 and collector assembly 25 within the end of can 12. As described further below, one function served by collector assembly 25 is to provide for a second external electrical contact for the electrochemical cell. Additionally, collector assembly 25 must seal the open end of can 12 to prevent the electrochemical materials therein from leaking from this cell. Additionally, collector assembly 25 must exhibit sufficient strength to withstand the physical abuse to which batteries are typically exposed. Also, because electrochemical cells may produce hydrogen gas, collector assembly 25 may allow internally-generated hydrogen gas to permeate therethrough to escape to the exterior of the electrochemical cell. Further, collector assembly 25 should include some form of pressure relief mechanism to relieve pressure produced internally within the cell should this pressure become excessive. Such conditions may occur when the electrochemical cell internally generates hydrogen gas at a rate that exceeds that at which the internally-generated hydrogen gas can permeate through the collector assembly to the exterior of the cell.

The collector assembly 25 shown in FIG. 1 includes a seal 30, a collector nail 40, an inner cover 44, a washer 50, and a plurality of spurs 52. Seal 30 is shown as including a central hub 32 having a hole through which collector nail 40 is inserted. Seal 30 further includes a V-shaped portion 34 that may contact an upper surface 16 of first electrode 15.

Seal 30 also includes a peripheral upstanding wall 36 that extends upward along the periphery of seal 30 in an annular fashion. Peripheral upstanding wall 36 not only serves as a seal between the interface of collector assembly 25 and can 12, but also serves as an electrical insulator for preventing an electrical short from occurring between the positive can and negative contact terminal of the cell.

Inner cover 44, which is formed of a rigid metal, is provided to increase the rigidity and supports the radial compression of collector assembly 25 thereby improving the sealing effectiveness. As shown in FIG. 1, inner cover 44 is configured to contact central hub portion 32 and peripheral upstanding wall 36. By configuring collector assembly 25 in this fashion, inner cover 44 serves to enable compression of central hub portion 32 by collector nail 40 while also supporting compression of peripheral upstanding wall 36 by the inner surface of can 12.

Outer cover 45 is typically made of a nickel-plated steel and is configured to extend from a region defined by the annular peripheral upstanding wall 36 of seal 30 and to be in electrical contact with a head portion 42 of collector nail 40. Outer cover 45 may be welded to head portion 42 of collector nail 40 to prevent any loss of contact. As shown in FIG. 1, when collector assembly 25 is inserted into the open end of can 12, collector nail 40 penetrates deeply within the electrolyte/second electrode mixture 20 to establish sufficient electrical contact therewith. In the example shown in FIG. 1, outer cover 45 includes a peripheral lip 47 that extends upwardly along the circumference of outer cover 45. By forming peripheral upstanding wall 36 of seal 30 of a length greater than that of peripheral lip 47, a portion of peripheral upstanding wall 36 may be folded over peripheral lip 47 during the crimping process so as to prevent any portion of the upper edge 13 of can 12 from coming into contact with outer cover 45.

Seal 30 is preferably formed of nylon. In the configuration shown in FIG. 1, a pressure relief mechanism is provided for enabling the relief of internal pressure when,such pressure becomes excessive. Further, inner cover 44 and outer cover 45 are typically provided with apertures 43 that allow the hydrogen gas to escape to the exterior of cell 10. The mechanism shown includes an annular metal washer 50 and a plurality of spurs 52 that are provided between seal 30 and inner cover 44. The plurality of spurs 52 each include a pointed end 53 that is pressed against a thin intermediate portion 38 of seal 30. Spurs 52 are biased against the lower inner surface of inner cover 44 such that when the internal pressure of cell 10 increases and seal 30 consequently becomes deformed by pressing upward toward inner cover 44, the pointed ends 53 of spurs 52 penetrate through the thin intermediate portion 38 of seal 30 thereby rupturing seal 30 and allowing the escape of the internally-generated gas through apertures 43.

Although the above-described collector assembly 25 performs all the, above-noted desirable functions satisfactorily, as apparent from its cross-sectional profile, this particular collector assembly occupies a significant amount of space within the interior of the cell 10. Because the exterior dimensions of the electrochemical cell are generally fixed by the American National Standards Institute (ANSI), the greater the space occupied by the collector assembly, the less space that there is available within the cell for the electrochemical materials. Consequently, a reduction in the amount of electrochemical materials that may be provided within the cell results in a shorter service life for the cell. It is therefore desirable to maximize the interior volume within an electrochemical cell that is available for the electrochemically active components.

It should be noted that the construction shown in FIG. 1 is but one example of a cell construction. Other collector assemblies exist that may have lower profiles and hence occupy less space within the cell. However, such collector assemblies typically achieve this reduction in occupied volume at the expense of the sealing characteristics of the collector assembly or the performance and reliability of the pressure relief mechanism. It is therefore desirable to construct an electrochemical cell where the space occupied by the collector assembly and the space occupied by the container volume are minimized while still maintaining adequate sealing characteristics and a reliable pressure relief mechanism.

The measured external and internal volumes for several batteries that were commercially available as of the filing date of this application are listed in the tables shown in FIGS. 2A and 2B. The tables list the volumes (cc) for D, C, AA, and AAA sized batteries. Also provided in FIG. 2A is a percentage of the total cell volume that constitutes the internal volume that is available for containing the electrochemically active materials. The total cell volume includes all of the volume, including any internal void spaces, of the battery. For the battery shown in FIG. 1, the total volume ideally includes all of the cross-hatched area as shown in FIG. 3A. The "internal volume" of the battery is represented by the cross-hatched area shown in FIG. 3B. The "internal volume," as used herein, is that volume inside the cell or battery that contains the electrochemically active materials as well as any voids and chemically inert materials (other than the collector nail) that are confined within the sealed volume of the cell. Such chemically inert materials may include separators, conductors, and any inert additives in the electrodes. As described herein, the term "electrochemically active materials" includes the positive and negative electrodes and the electrolyte.

The collector assembly volume includes the collector nail, seal, inner cover, and any void volume between the bottom surface of the negative cover and the seal (indicated by the cross-hatched area in FIG. 3C). It should be appreciated that the sum total of the "internal volume," "collector assembly volume," and "container volume" is equal to the total volume. Accordingly, the internal volume available for electrochemically active materials can be confirmed by measuring the collector assembly volume and container volume and subtracting the collector assembly volume and the container volume from the measured total volume of the battery. The "container volume" includes the volume of the can, label, negative cover, void volume between the label and negative cover, positive cover, and void volume between the positive cover and can (shown by the cross-hatched area in FIG. 3D). If the label extends onto and into contact with the negative cover, the void volume present between the label and negative cover is included in the container volume, and therefore is also considered as part of the total volume. Otherwise, that void volume is not included in either of the container volume or the total volume. The collector assembly volume and the percentage of the total cell volume that constitutes the collector assembly volume is provided in FIG. 2B for those commercially available batteries listed in FIG. 2A.

The total battery volume, collector assembly volume, and internal volume available for electrochemically active material for each battery are determined by viewing a Computer Aided Design (CAD) drawing, a photograph, or an actual cross section of the battery which has been encased in epoxy and longitudinally cross-sectioned. The use of a CAD drawing, photograph, or actual longitudinal cross section to view and measure battery dimensions allows for inclusion of all void volumes that might be present in the battery. To measure the total battery volume, the cross-sectional view of the battery taken through its central longitudinal axis of symmetry is viewed and the entire volume is measured by geometric computation. To measure the internal volume available for electrochemically active materials, the cross-sectional view of the battery taken through its central longitudinal axis of symmetry is viewed, and the components making up the internal volume, which includes the electrochemically active materials, void volumes and chemically inert materials (other than the collector nail) that are confined within the sealed volume of the cell, are measured by geometric computation. Likewise, to determine volume of the collector assembly, the cross-sectional view of the battery taken through its central longitudinal axis of symmetry thereof is viewed, and the components making up the collector assembly volume, which include the collector nail, seal, inner cover, and any void volume defined between the bottom surface of the negative cover and the seal, are measured by geometric computation. The container volume may likewise be measured by viewing the central longitudinal cross section of the battery and computing the volume consumed by the can, label, negative cover, void volume between the label and negative cover, positive cover, and void volume between the positive cover and the can.

The volume measurements are made by viewing a cross section of the battery taken through its longitudinal axis of symmetry. This provides for an accurate volume measurement, since the battery and its components are usually axial symmetric. To obtain a geometric view of the cross section of a battery, the battery was first potted in epoxy and, after the epoxy solidified, the potted battery and its components were ground down to the central cross section through the axis of symmetry. More particularly, the battery was first potted in epoxy and then ground short of the central cross section. Next, all internal components such as the anode, cathode, and separator paper were removed in order to better enable measurement of the finished cross section. The potted battery was then cleaned of any remaining debris, was air dried, and the remaining void volumes were filled with epoxy to give the battery some integrity before completing the grinding and polishing to its center. The battery was again ground and polished until finished to its central cross section, was thereafter traced into a drawing, and the volumes measured therefrom.

Prior to potting the battery in epoxy, battery measurements were taken with calipers to measure the overall height, the crimp height, and the outside diameter at the top, bottom, and center of the battery. In addition, an identical battery was disassembled and the components thereof were measured. These measurements of components of the disassembled battery include the diameter of the current collector nail, the length of the current collector nail, the length of the current collector nail to the negative cover, and the outside diameter of the top, bottom, and center of the battery without the label present.

Once the battery was completely potted in epoxy and ground to center through the longitudinal axis of symmetry, the cross-sectional view of the battery was used to make a drawing. A Mitutoyo optical comparitor with QC-4000 software was used to trace the contour of the battery and its individual components to generate a drawing of the central cross section of the battery. In doing so, the battery was securely fixed in place and the contour of the battery parts were saved in a format that could later be used in solid modeling software to calculate the battery volumes of interest. However, before any volume measurements were taken, the drawing may be adjusted to compensate for any battery components that are not aligned exactly through the center of the battery. This may be accomplished by using the measurements that were taken from the battery before cross sectioning the battery and those measurements taken from the disassembled identical battery. For example, the diameter and length of the current collector nail, and overall outside diameter of the battery can be modified to profile the drawing more accurately by adjusting the drawing to include the corresponding known cross-sectional dimensions to make the drawing more accurate for volume measurements. The detail of the seal, cover, and crimp areas were used as they were drawn on the optical comparitor.

To calculate the volume measurements, the drawing was imported into solid modeling software. A solid three-dimensional volume representation was generated by rotating the contour of the cross section on both the left and right sides by one-hundred-eighty degrees (180°) about the longitudinal axis of symmetry. Accordingly, the volume of each region of interest is calculated by the software and, by rotating the left and right sides by one-hundred-eighty degrees (180°) and summing the left and right volumes together an average volume value is determined, which may be advantageous in those situations where the battery has non-symmetrical features. The volumes which include any non-symmetrical features can be adjusted as necessary to obtain more accurate volume measurements.

SUMMARY OF THE INVENTION

Accordingly, it is an aspect of the present invention to solve the above problems by either eliminating the collector assembly from the cell while retaining its functions, or by providing a collector assembly having a significantly lower profile and thereby occupying significantly less space within an electrochemical cell. Another aspect of the present invention is to provide cell constructions exhibiting lower water loss over time than prior assemblies, thereby increasing the cell's shelf life. An additional aspect of the invention is to provide a battery having a reliable pressure relief mechanism that does not occupy a significant percentage of the available cell volume. Still yet another aspect of the present invention is to provide cell constructions that are simpler to manufacture and that require less materials, thereby possibly having lower manufacturing costs. Another aspect of the invention is to provide cell constructions that require less radial compressive force to be applied by the can to adequately seal the cell, thereby allowing for the use of a can having thinner side walls, and thus resulting in greater internal cell volume.

To achieve some of these and other aspects and advantages, a battery of the present invention comprises a can for containing electrochemical materials including positive and negative electrodes and an electrolyte, the can having a first end, an open second end, side walls extending between the first and second ends, and an end wall extending across the first end; a pressure relief mechanism formed in the end wall of the can for releasing internal pressure from within the can when the internal pressure becomes excessive; a first outer cover positioned on the end wall of the can to be in electrical contact therewith and to extend over the pressure relief mechanism; a second outer cover positioned across the open second end of the can; and an insulator disposed between the can and the second outer cover for electrically insulating the can from the second outer cover.

Additionally, some of the above aspects and advantages may be achieved by a battery of the present invention that comprises a can for containing electrochemically active materials including at least positive and negative electrodes and an electrolyte, the can having a first end, an open second end, side walls extending between the first and second ends, and an end wall extending across the first end, the can further having a flange that extends outward from the open second end of the can towards the first end; a cover for sealing the open end of the can, the cover having a peripheral edge that extends over and around the flange and is crimped between the flange and an exterior surface of the side walls of the can; and electrical insulation provided between the flange and the peripheral edge of the cover and between the can and the peripheral edge. The electrical insulating material is preferably provided in the form of a coating deposited directly on at least one of the can and the outer cover.

Further, some of the above aspects and advantages may also be achieved by an electrochemical cell of the present invention that comprises a can for containing electrochemically active materials including at least positive and negative electrodes and an electrolyte, the can having an open end and a closed end, and side walls extending between the open end and closed end; a first outer cover positioned across the open end of the can; a collector electrically coupled to the first outer cover and extending internally within the can to electrically contact one of the positive and negative electrodes; and an annular seal having an L-shaped cross section disposed between the can and the first outer cover for electrically insulating the can from the first outer cover and creating a seal between the first outer cover and the can. The seal may further include an extended vertical member to form a J-shaped cross section. According to this embodiment, a pressure relief mechanism is preferably formed in a surface of the can for releasing internal pressure from within the can when the internal pressure becomes excessive.

Yet, some of the above aspects and advantages may be achieved by an electrochemical cell of the present invention that comprises a can for containing electrochemically active materials including at least positive and negative electrodes and an electrolyte, the can having an open end, a closed end, and side walls extending between the open and closed ends; a cover positioned across the open end of the can and connected to the can, the cover having an aperture extending therethrough; a current collector extending through the aperture in the cover and extending internally within the can to electrically contact one of the positive and negative electrodes; and an insulating material disposed between the collector and the cover for electrically insulating the collector from the cover and creating a seal between the collector and the cover. In addition, the electrochemical cell preferably includes a first contact terminal electrically coupled to the collector and a dielectric material disposed between the first contact terminal and the cover for electrically insulating the cover from the first contact terminal. Also provided is a method of manufacturing an electrochemical cell which includes the steps of dispensing active electrochemical materials in a can having a closed end and an open end; disposing a collector through an aperture formed in a cover; providing a dielectric insulating material between the cover and the collector to provide electrical insulation therebetween; and assembling the cover and collector to the open end of the can.

Further, some of the above aspects and advantages may also be achieved by a battery of the present invention that comprises a can for containing electrochemically active materials including positive and negative electrodes and an electrolyte, and a label printed directly on an exterior surface of the can. A method of assembling a battery is also provided including the steps of forming a can having an open end and a closed end, forming an outer cover, dispensing electrochemically active materials in the can, sealing the outer cover across the open end of the can with a layer of electrical insulation provided therebetween, and printing a label directly on the exterior surface of the can. According to this embodiment, the diameter of the can may be correspondingly increased to allow a significant increase in the internal volume of the battery, while maintaining a predetermined total outside diameter.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 2A is a table showing the relative total battery volumes and internal cell volumes available for electrochemically active materials, as measured for those batteries that were commercially available at the time this application was filed;

FIG. 2B is a table showing the relative total battery volumes and collector assembly volumes as measured for those batteries that were commercially available as provided in FIG. 2A;

FIG. 9 is a bottom view of a battery can having a pressure relief mechanism formed in the closed end of the can;

FIG. 10 is a cross-sectional view taken along line X—X of the can vent shown in FIG. 9;

FIG. 12A is a partially exploded perspective view of the battery shown in FIG. 11;

FIGS. 12B and 12C are cross-sectional views of a portion of the battery shown in FIG. 11 illustrating the process for forming the beverage can-type construction;

FIG. 12D is an enlarged cross-sectional view of a portion of the battery shown in FIG. 11;

FIG. 14A is a table showing the calculated total and internal cell volume for various batteries constructed in accordance with the present invention;

FIG. 14B is a table showing the calculated total volume and collector assembly volume for various batteries constructed in accordance with the present invention;

FIG. 17 is a flow diagram illustrating a method of assembly of the electrochemical cell shown in FIGS. 15 and 16.

DETAILED DESCRIPTION OF PREFERRED EMBODIMENTS

As described above, a primary objective of the present invention is to increase the internal volume available in a battery for containing the electrochemically active materials to volumes previously not obtained. To achieve this objective without detrimentally decreasing the reliability of the pressure relief mechanism provided in the battery and without increasing the likelihood that the battery would otherwise leak, various novel modifications are suggested below to the construction of batteries of various sizes. The modifications described below may be implemented separately or in combination in a battery to improve its volume efficiency.

Figures 15, 16:
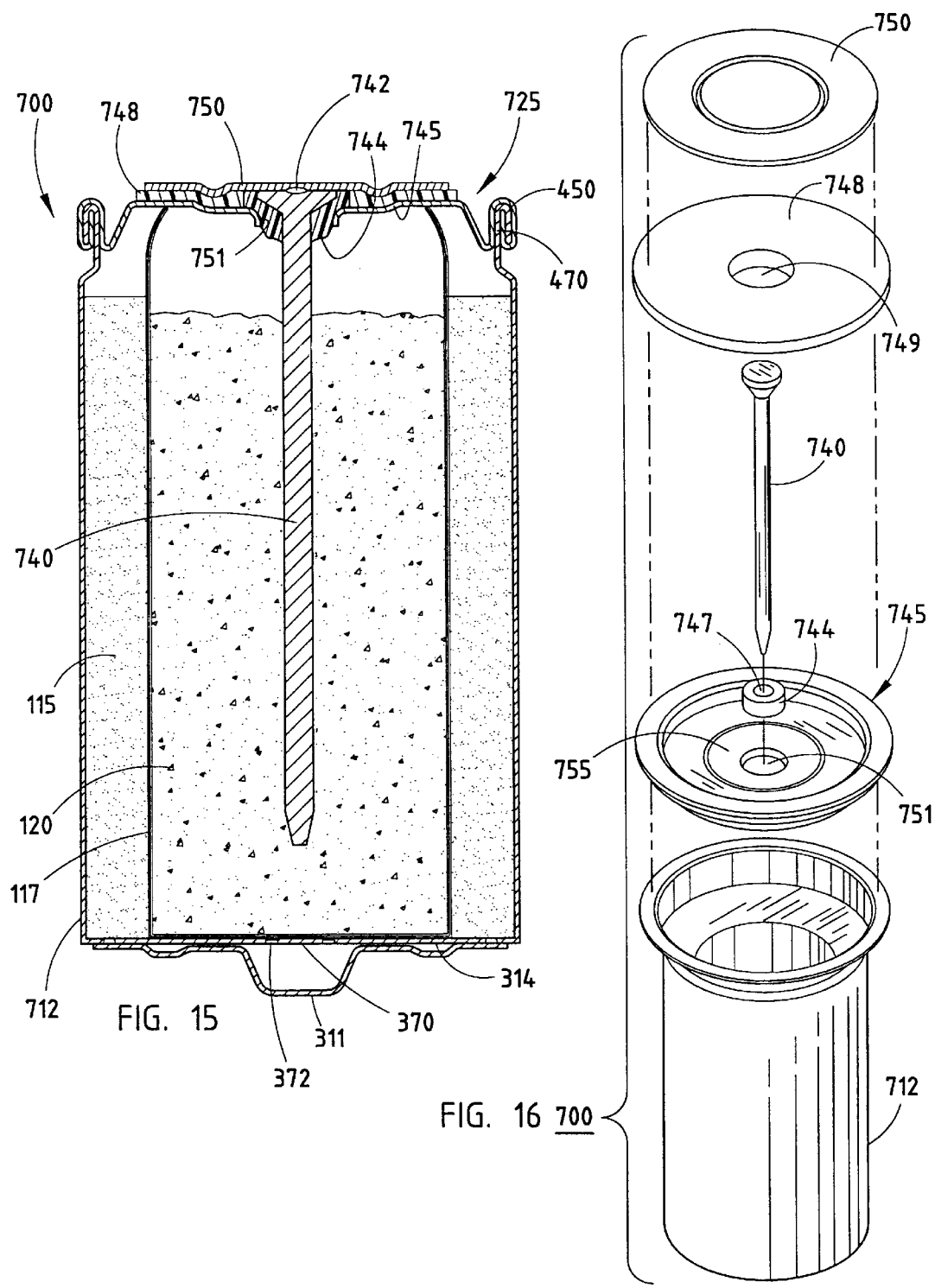
FIG. 15 is a cross section of a C sized alkaline electrochemical cell having a collector feed through construction according to a seventh embodiment of the present invention.
FIG. 16 is an exploded assembly view of the electrochemical cell shown in FIG. 15.

As described in further detail below, the various modifications of the present invention that achieve greater internal volume for containing the electrochemically active materials, include a low profile seal (FIG. 4), an ultra low profile seal (FIG. 5), a positive outer cover protrusion formed directly in the closed end of the can used in combination with the ultra low profile seal (FIG. 6) or the low profile seal, a can vent formed in the closed end of the battery can (FIGS. 7–9) including an L-shaped and J-shaped annular seal (FIGS. 8A–8C), a beverage can-type construction used in combination with a can vent (FIG. 11), and a beverage can-type construction with a collector feed through (FIGS. 15–17).

Additionally, through the use of the constructions noted above, the battery can may be made with thinner walls, on the order of 4–8 mils, since the construction techniques outlined below do not require the thicker walls that are required in conventional batteries to ensure a sufficient crimp and seal. Further, in accordance with the present invention, a label may be lithographed directly onto the exterior surface of the battery can. By making the can walls thinner and lithographing the label directly onto the exterior of the can, the internal volume of the cell may be further increased since one does not have to account for the thickness of the label substrate to construct a cell that meets the ANSI exterior size standards.

Low Profile Seal

Figure 4:
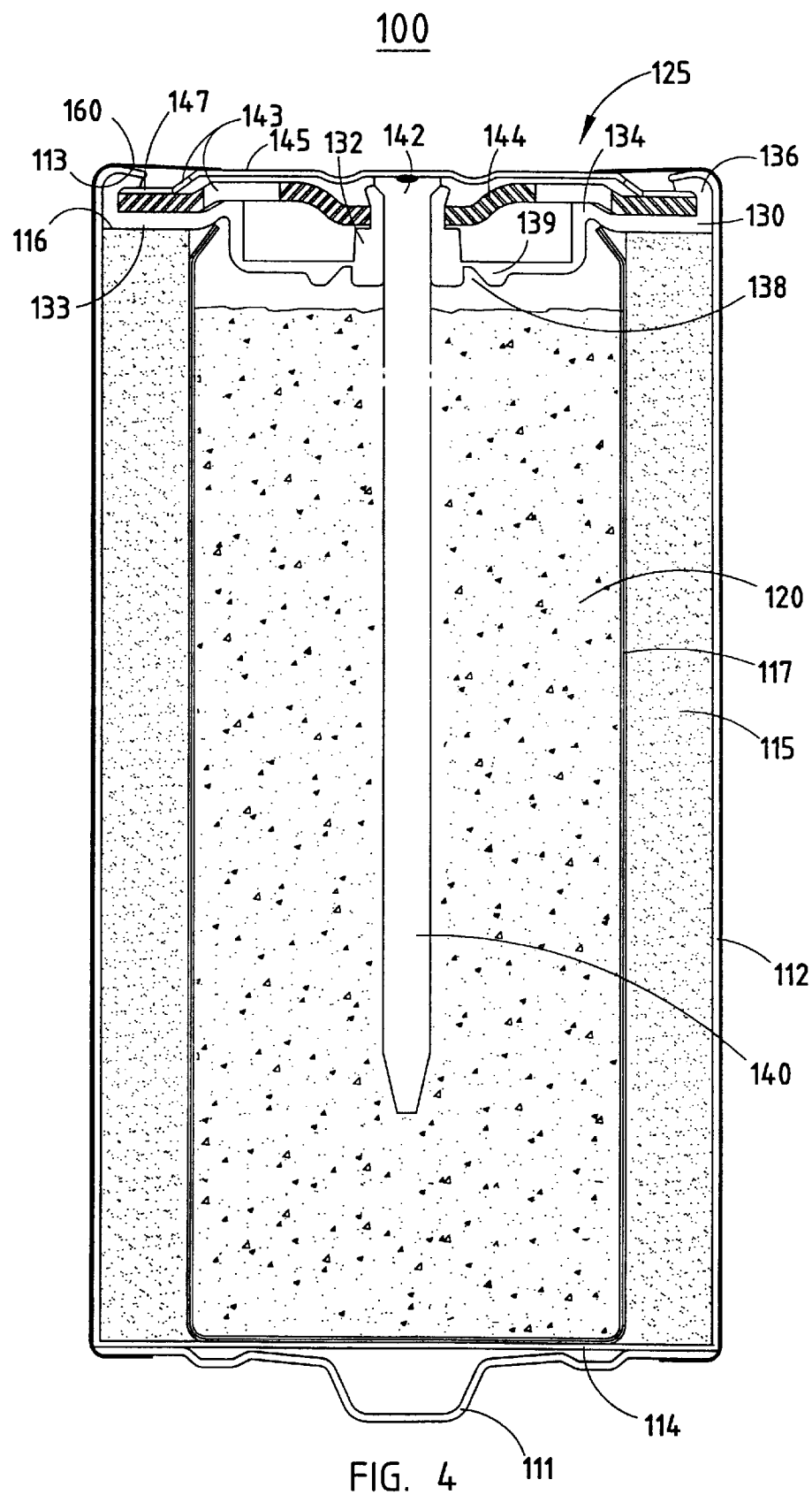
FIG. 4 is a cross section of a C sized alkaline electrochemical cell having a low profile seal constructed in accordance with a first embodiment of the present invention.

FIG. 4 shows a battery constructed using a low profile seal in accordance with a first embodiment of the present invention. Similar to the battery shown in FIG. 1, battery 100 includes an electrically conductive can 112 having a closed end 114 and an open end in which a collector assembly 125 and negative cover 145 are secured in place. Also, battery 100 includes a positive electrode 115 in contact with the interior walls of can 112 and in contact with a separator layer 117 that lies between positive electrode 115 and a negative electrode 120. Further, battery 100 includes a positive outer cover 111 attached to a bottom surface of the closed end of can 112.

The difference between batteries 10 and 100 lies in the construction of collector assembly 125 and cover 145. While seal 130 is similar to seal 30 in that it includes an upstanding wall 136 and a central hub 132, which has an aperture formed therein for receiving the head portion 142 of a collector nail 140, seal 130 differs from seal 30 in that the V portion 34 of seal 30 is inverted to extend upward toward inner cover 144, as indicated by reference numeral 134. By inverting this V portion, collector assembly 125 may rest more squarely upon an upper surface 116 of positive electrode 115. Further, the volume occupied by the V portion 34 of battery 10 may then be used for the electrochemically active materials.

To also reduce the internal volume occupied by collector assembly 125, inner cover 144 is constructed to more closely conform to the inner surface of outer cover 145 so as to eliminate the void space between outer cover 45 and inner cover 44 in battery 10. Additionally, by resting collector assembly 125 firmly on top surface 116 of positive electrode 115, the peripheral edge 147 of outer cover 145 may be flat rather than extend upward, as in the case for battery 10. By laying peripheral edge 147 flat, collector assembly 125 may be positioned even closer to the end of battery 100.

Collector assembly 125 of battery 100 further differs from collector assembly 25 of battery 10 in that spurs 52 and washer 50 are eliminated. Collector assembly 125, nevertheless, has a reliable pressure relief mechanism by the provision of a thinned-out section 138 formed in seal 130 immediately adjacent hub 132. A thickened ring portion 139 of seal 130 is provided adjacent thinned-out portion 138 such that thinned-out portion 138 lies between thickened ring portion 139 and the relatively thick hub 132. Thus, when the internal pressure of cell 100 becomes excessive, seal 130 rips open in the location of thinned-out portion 138. As with the construction shown for battery 10, the internally-generated gas then escapes through apertures 143 formed in inner cover 144 and outer cover 145.

Figure 1:
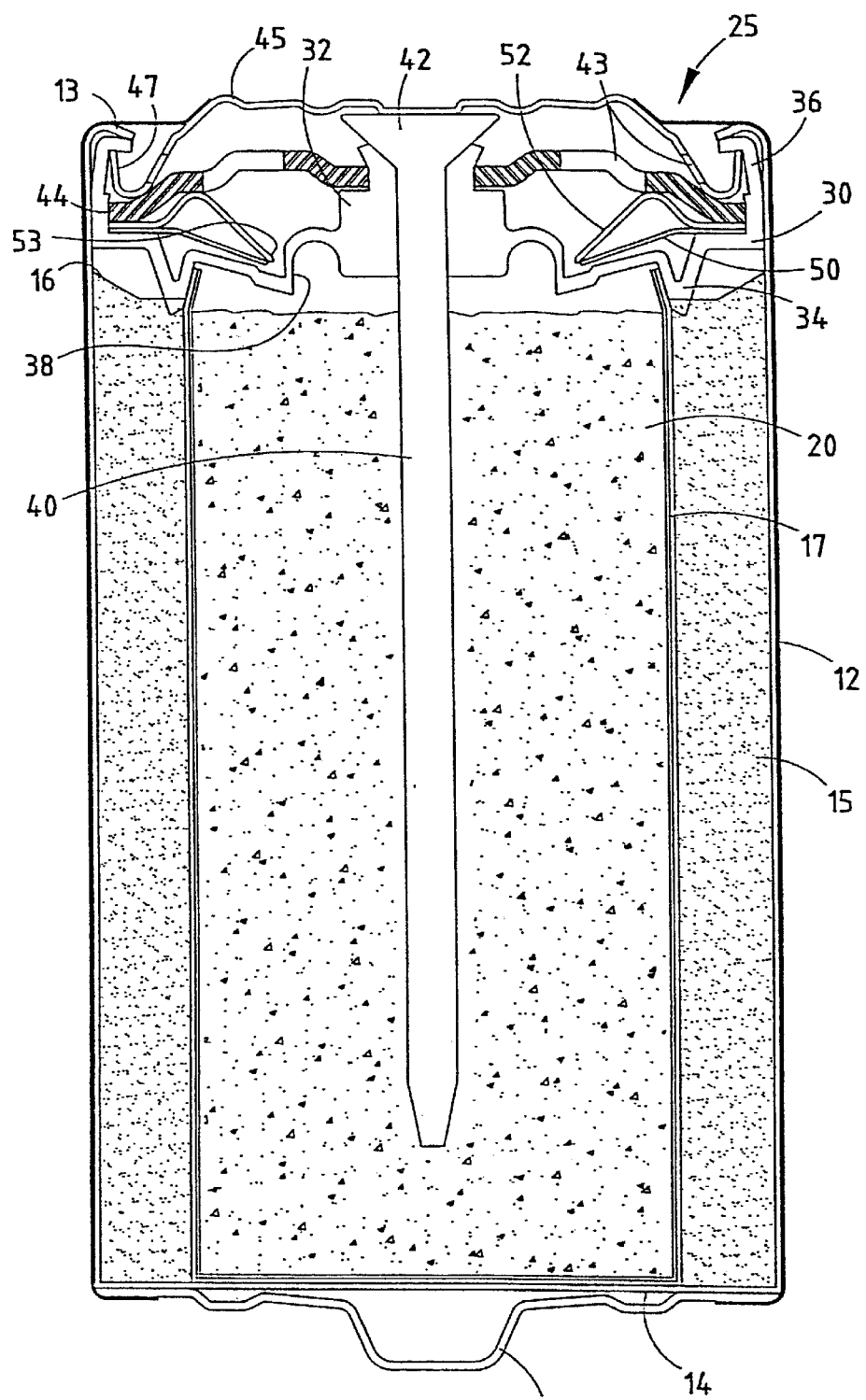
FIG. 1 is a cross section of a conventional C sized alkaline electrochemical cell.
Figure 3A:
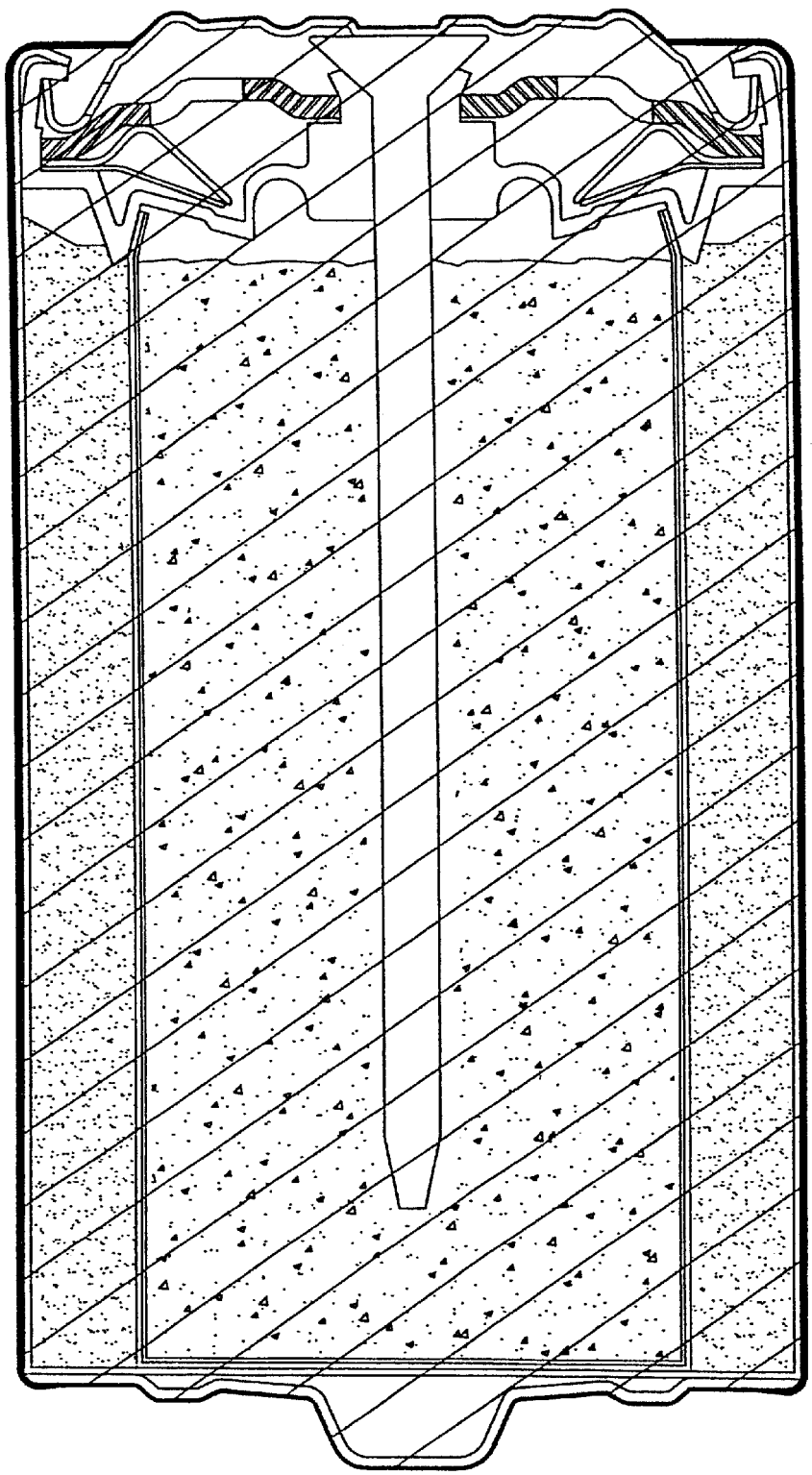
FIGS. 3A–3D are cross sections of a conventional C sized alkaline electrochemical cell that illustrate the total battery and various component volumes.
Figure 3B:
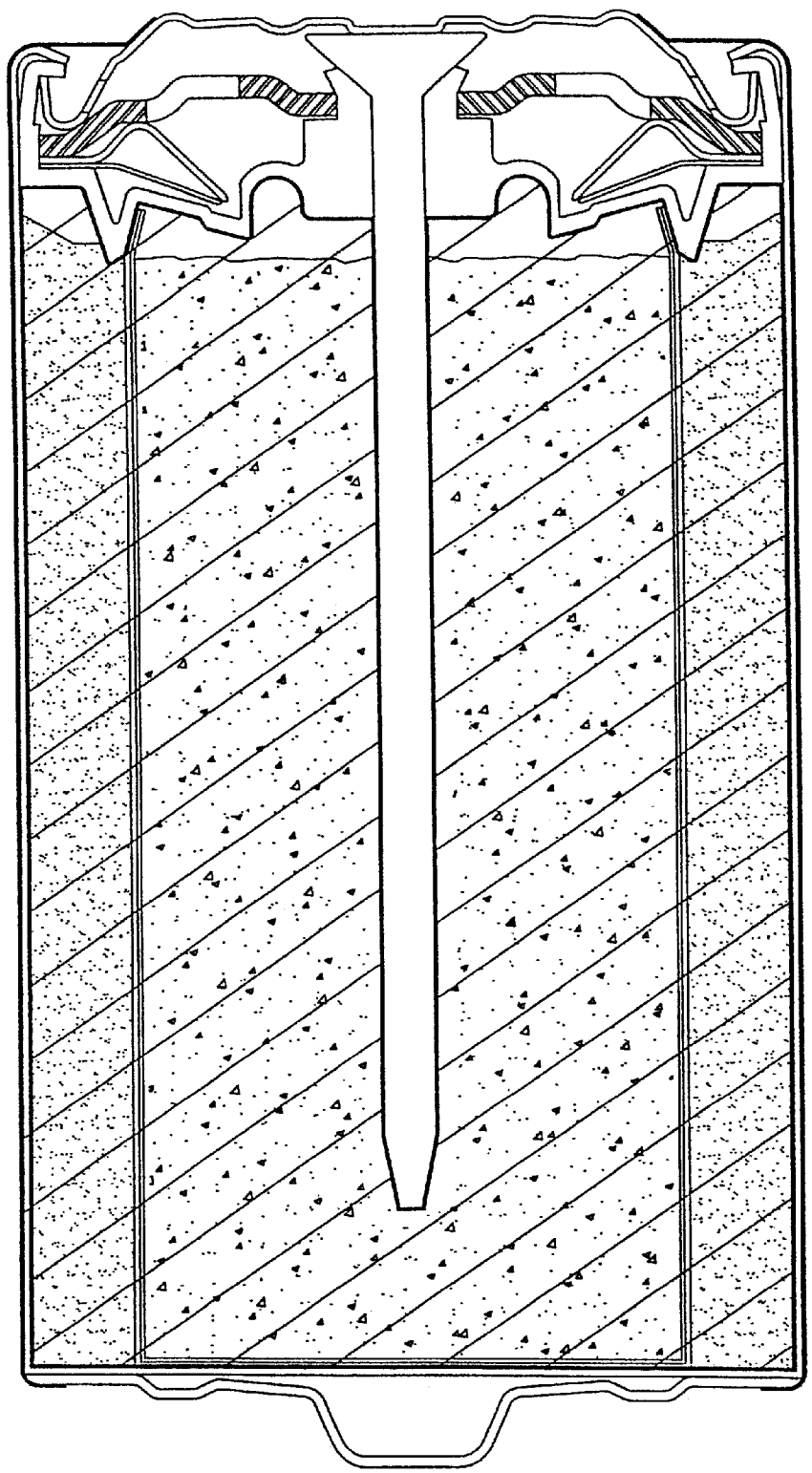
Figure 3C:
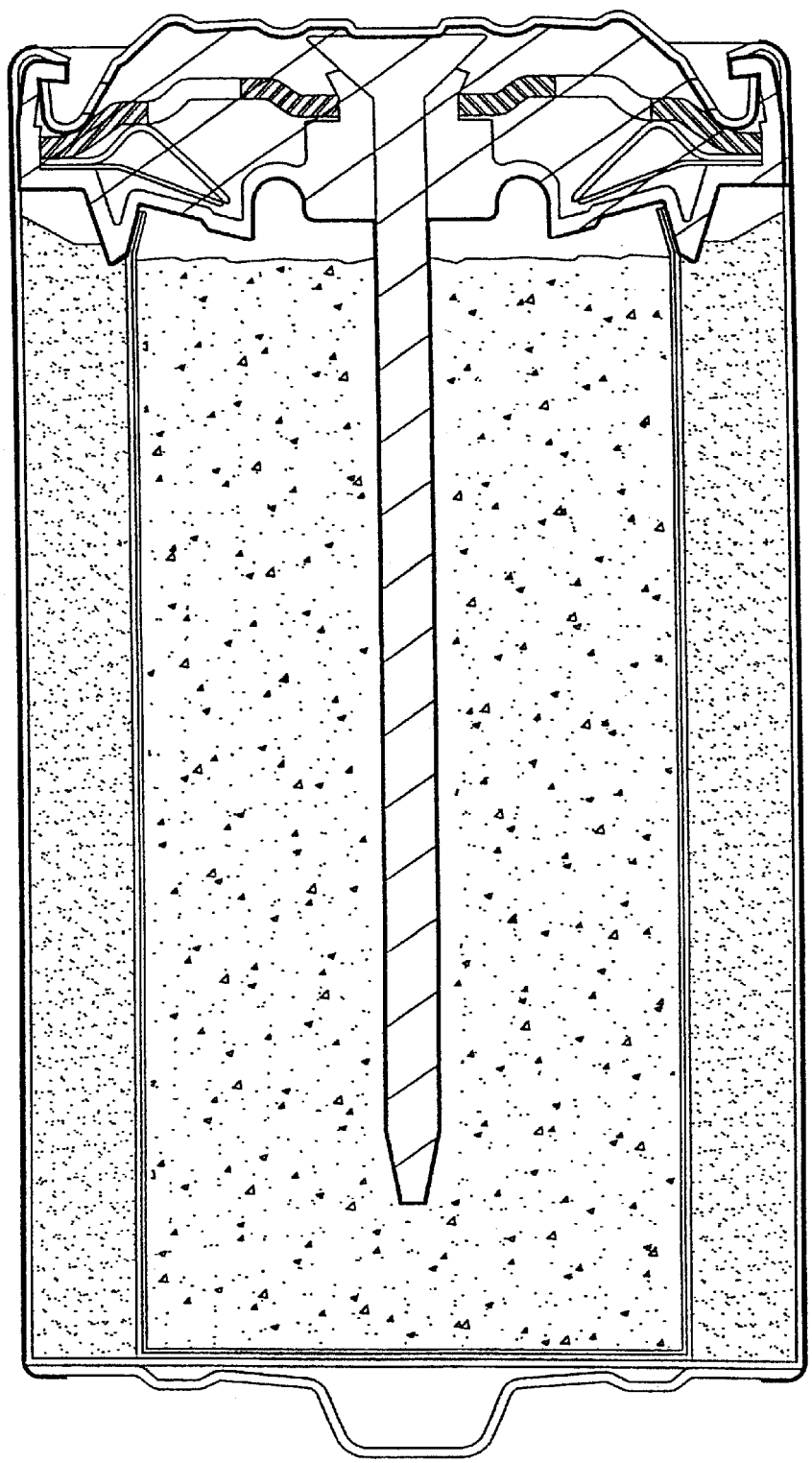
Figure 3D:
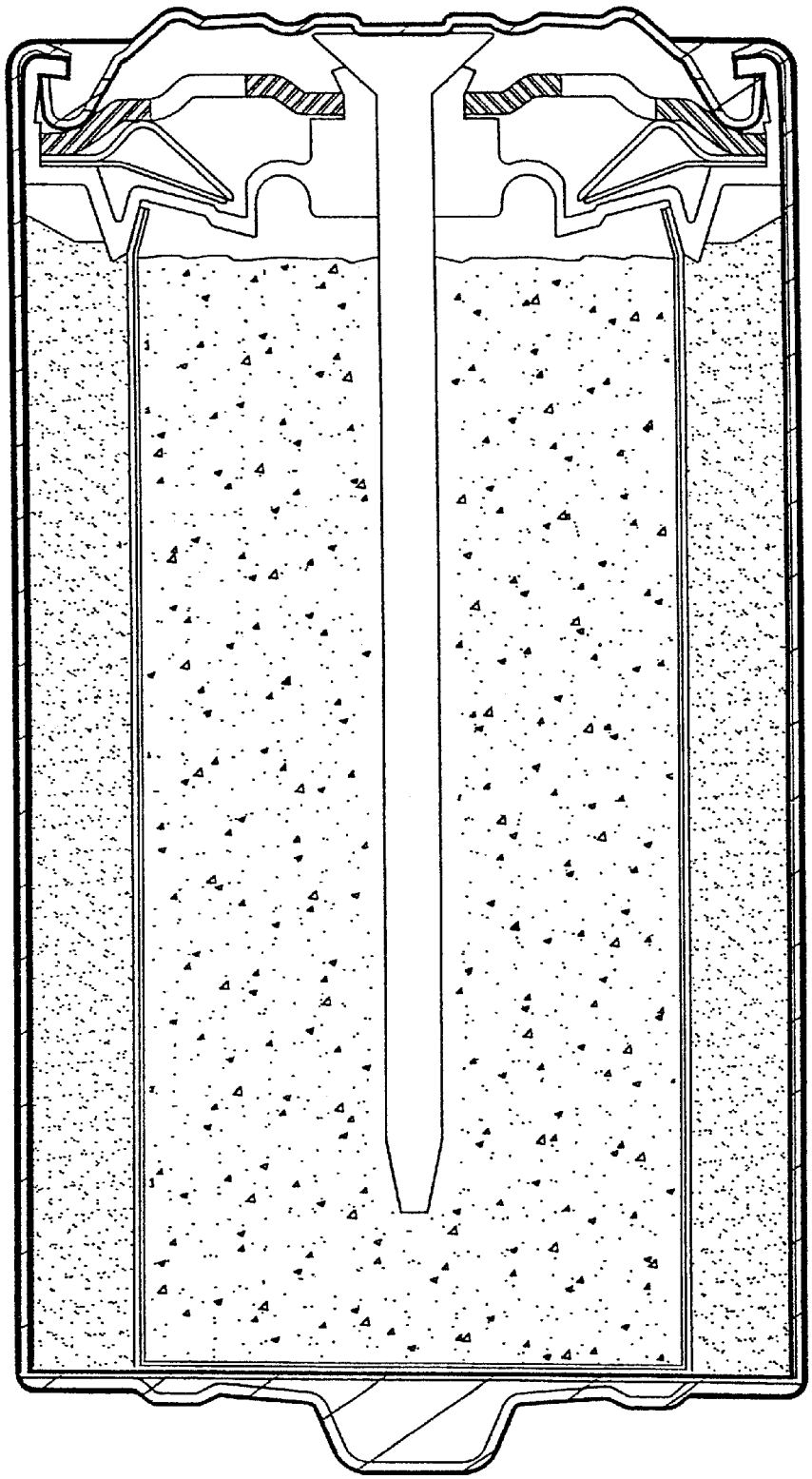

The internal volume available for containing electrochemically active materials in a D sized battery having the conventional construction shown in FIG. 1, is 44.16 cc, which is 87.7 percent of the total volume of 50.38 cc. (See the corresponding entry in the table of FIG. 2A.) If the same cell were constructed using the low profile seal construction shown in FIG. 4, the internal cell volume may be increased to 44.67 cc, which represents 89.2 percent of the total volume, which is 50.07 cc. The internal and external volumes for the cell constructed with the low profile seal of the present invention are for a cell having a 10 mil can thickness. Further, by decreasing the can wall thickness, even greater internal cell volumes may be achieved.

The low profile seal described above is disclosed in commonly-assigned U.S. patent application Ser. No. 08/882,572 entitled "A V-SHAPED GASKET FOR GALVANIC CELLS," filed on Jun. 27, 1997, by Gary R. Tucholski, the disclosure of which is incorporated by reference herein.

Figure 5:
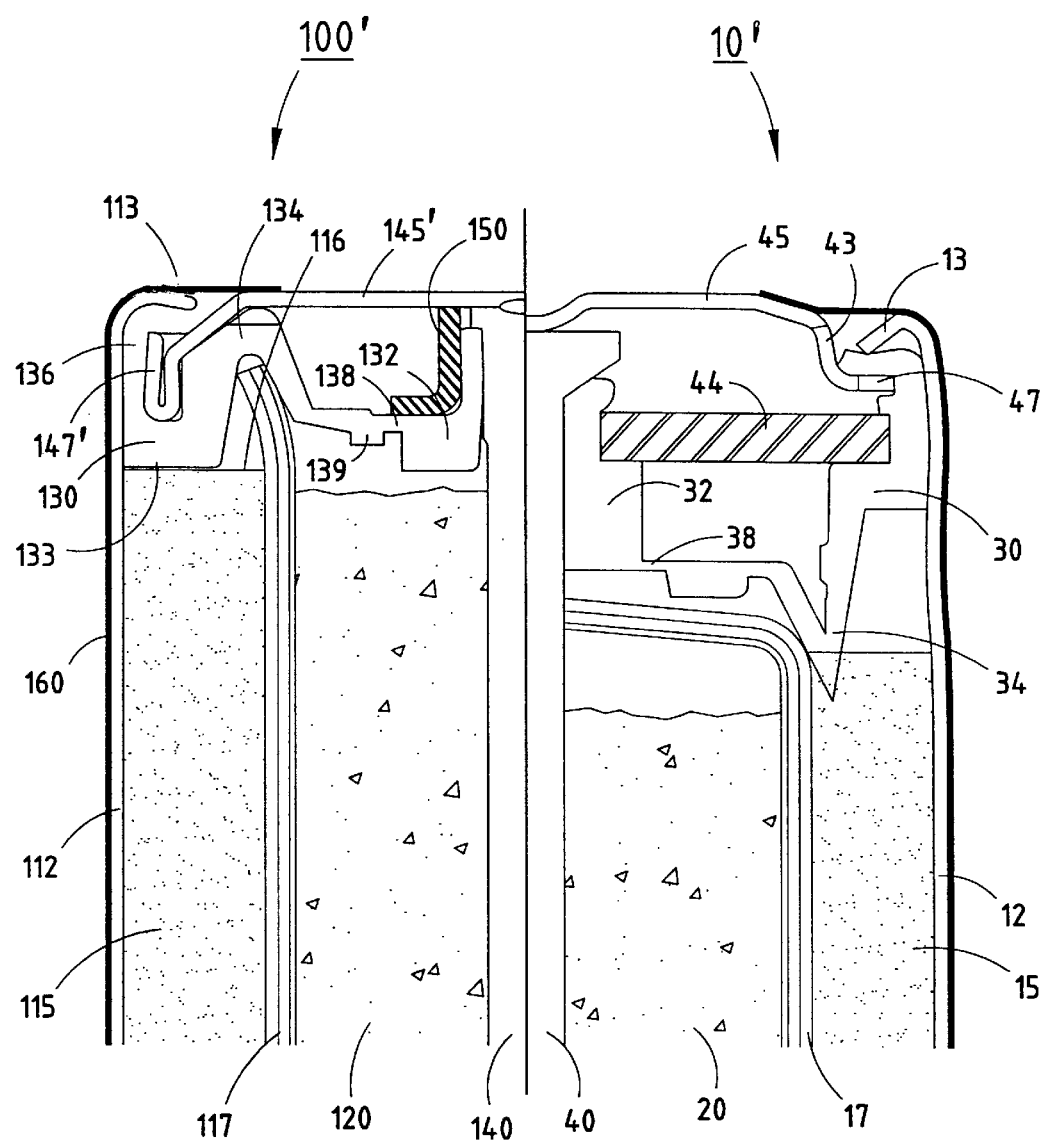
FIG. 5 is a partial cross section of an adaption of the first embodiment for use in an AA sized battery shown in comparison with a partial cross section of an adaptation of the conventional construction as currently used in an AA sized battery.

FIG. 5 shows a modified adaptation of the low profile seal as used in an AA sized battery 100' in comparison with a commercial adaptation of the construction shown in FIG. 1 as used for an AA sized battery 10'. Like the collector assembly of battery 100 (FIG. 4), the collector assembly of battery 100' includes a seal 130 having an inverted-V portion 134, a hub portion 132, and a thinned-out portion 138 provided between hub 132 and a thickened portion 139.

The primary difference between the collector assemblies of batteries 100 and 100' is the elimination of inner cover 144 of battery 100. To ensure sufficient radial compressive force against upstanding leg 136 of seal 130, battery 100' uses a rollback cover 145' in place of the flanged cover 145 used in battery 100 and also utilizes a retainer 150. As will be apparent from a comparison of FIGS. 4 and 5, a rollback cover differs from a flanged cover in that the peripheral edge 147 of a flanged cover 145 is flat whereas the peripheral edge 147' of a rollback cover 145' extends axially downward and is folded to also extend axially upward. Rollback cover 145' provides a sufficient spring force in the radial direction to maintain compression of upstanding leg 136 of seal 130 against the inner wall of can 112 during normal use.

Retainer 150 is provided over and around the upper portion of hub 132 of seal 130 to compress hub 132 against collector nail 140. Also, by configuring retainer 150 to have a J- or L-shaped cross section, the lower radial extension of retainer 150 can ensure that seal 130 will rupture in the vicinity of thinned-out portion 138 when the internal pressure reaches an excessive level.

Ultra Low Profile Seal

Figure 6:
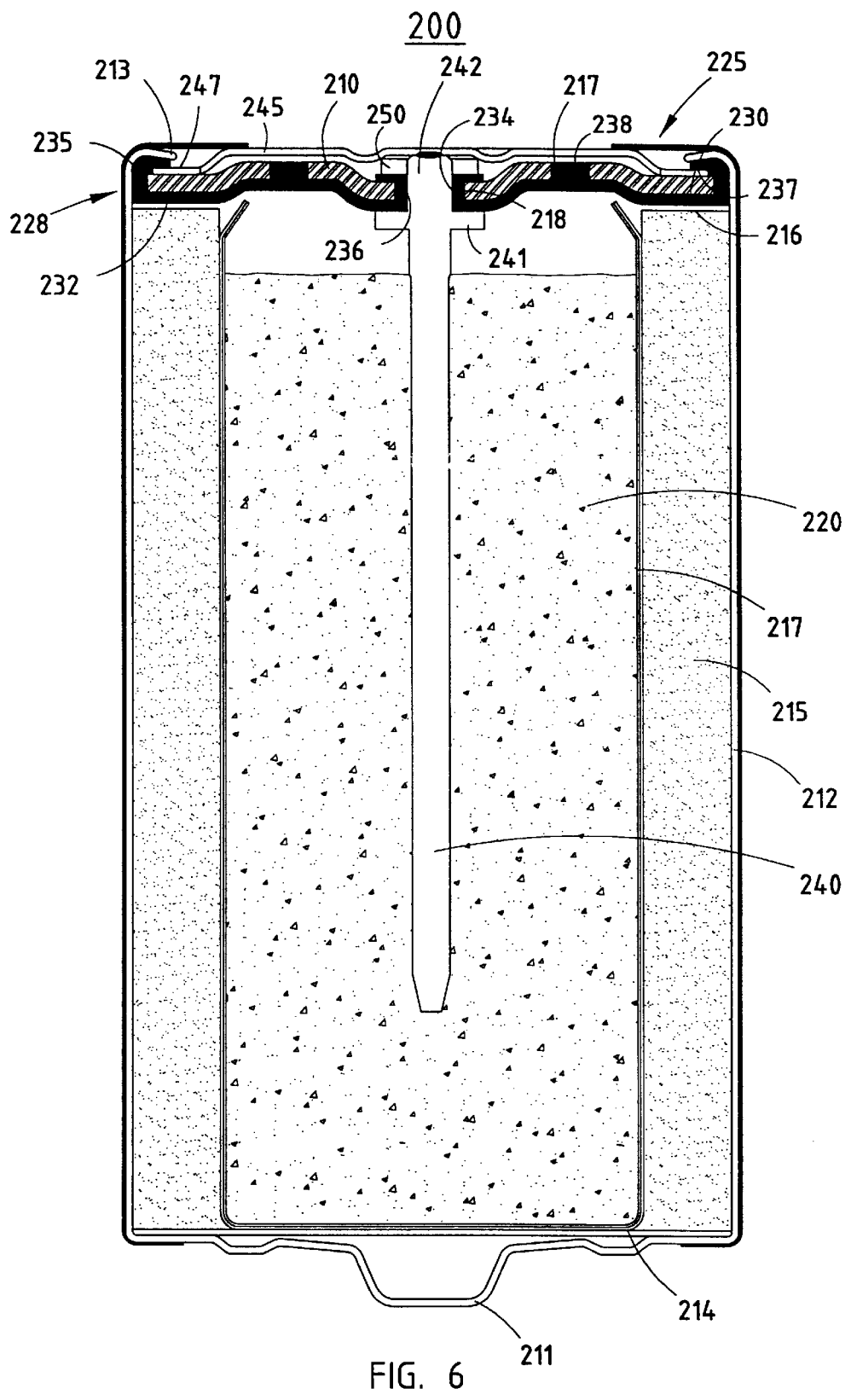
FIG. 6 is a cross section of a C sized alkaline electrochemical cell having an ultra low profile seal according to a second embodiment of the present invention.

FIG. 6 shows a battery constructed in accordance with a second embodiment of the present invention, which utilizes an ultra low profile seal. Like the conventional cell 10 shown in FIG. 1, cell 200 also includes a cylindrical can 212 made of an electrically conductive material. Also, a first electrode 215 is formed against the inner walls of can 212 preferably by molding. A separator 217 is likewise inserted within the cavity defined by first electrode material 215, and a mixture 220 of a second electrode and electrolyte are provided within a cavity defined by the separator 217.

As shown in FIG. 6, collector assembly 225 includes an integral seal/inner cover assembly 228 and a collector 240 that passes through a central hole 236 provided in the integral seal/inner cover assembly 228. Collector 240 is preferably a brass nail including a head 242 and a retainer flange 241 that is provided to cooperate with a speed nut 250 to secure collector nail 240 within central hole 236 of integrated seal/inner cover assembly 228.

Integrated seal/inner cover assembly 228 includes a rigid inner cover 210 and a seal 230 that is formed directly on rigid inner cover 210 by molding or lamination. Seal 230 is preferably made of neoprene, butyl, or ethylene propylene rubber, and rigid inner cover 210 is preferably formed of low-carbon steel 1008 or 1010. Because rubber is more compressible than the nylon or polypropylene materials often used in such collector assemblies, the radial compressive strength of the rigid inner cover 210 need not be as great. Thus, the inner cover could be made of thinner and/or softer metals. Further, materials other than metal may be used. Also, seal 230 may be formed of other materials provided such materials are chemically inert, water impervious, compressible, and exhibit the ability to bond to the material used to form rigid inner cover 210.

Additionally, by decreasing the radial force required to compress the peripheral upstanding wall of the seal, the thickness of the can walls may be decreased from 0.010 inch (10 mils) to approximately 0.006 (6 mils) or possibly even 0.004 inch (4 mils).

By providing a structure that enables rubber materials such as neoprene and butyl rubber to be used as the seal material, the water permeability of the collector assembly is significantly reduced. By reducing the water permeability of the cell, the service maintenance of the battery should be increased.

Rigid inner cover 210 is generally disk shaped and has a central aperture 218 formed at its center as well as a plurality of additional apertures 217. Central aperture 218 and additional apertures 217 extend through rigid inner cover 210 from its upper surface to its bottom surface. If formed of metal, rigid inner cover 210 is preferably produced by stamping it from a sheet of metal. Inner cover 210 may, however, be formed using other known manufacturing techniques. Subsequently, rigid inner cover 210 may be subjected to a surface roughening process, such as sandblasting or chemical etching, to enhance the strength of the bond that is subsequently formed between rigid inner cover 210 and seal 230. For a C sized cell, rigid inner cover 210 is preferably 0.015 to 0.030 inch thick.

After rigid inner cover 210 has been stamped and surface treated, it is preferably inserted into a transfer mold press into which the rubber that forms seal 230 is subsequently supplied. The transfer mold is preferably formed to allow the supplied rubber to form a layer 232 across the bottom surface of rigid inner cover 210. The thickness of layer 232 is between 0.010 and 0.020 inch thick, and is preferably about 0.016 inch thick. The rubber also flows into apertures 217 to form plugs 238. Also, the rubber flows within central aperture 218 so as to line the surfaces of central aperture 218 but without completely filling the aperture so as to provide a central hole 236 into which collector nail 240 may subsequently be inserted. The diameter of central hole 236 is preferably sufficiently smaller than the diameter of collector nail 240 such that the rubber lining in central aperture 218 is significantly compressed within aperture 218 when collector nail 240 is driven in place through central hole 236. By providing a retainer 241 on collector 240 that is pressed against bottom layer 232 of seal 230, when collector nail 240 has been driven in place, its speed nut 250 and retainer 241 cooperate to also vertically compress the portion of rubber layer 232 lying therebetween. By compressing the rubber seal in the vicinity of collector nail 240 in this manner, the possibility of a leak occurring in the interface between the collector nail 240 and integrated seal/inner cover assembly 228 is significantly reduced.

By filling apertures 217 with rubber seal plugs 238 in the manner shown, a pressure relief mechanism is provided that not only works reliably, but which may effectively reseal after internal pressure has been released. When the internal pressure reaches levels considered to be excessive, the excessive pressure ruptures at least one of plugs 238 to allow the expedited release of internally-generated gasses. The pressure at which such rupturing occurs is controllable based upon the materials selected for the seal, the thickness of the seal material, and the diameter of apertures 217. Further, because of the elasticity of the rubber seal material, the rubber plug 238 substantially assumes its original state once the pressure has been released. Thus, unlike other venting mechanisms used in conventional collector assemblies, the pressure relief mechanism of the present invention does not create a permanent hole within the collector assembly through which electrochemical materials may subsequently leak. Also, such resealing minimizes deterioration of the cell's internal components, thereby possibly extending the useful cell life.

Although only one aperture 217 in plug 238 need be provided to serve as a pressure relief mechanism, added reliability is obtained by providing a plurality of such plugged apertures. Unlike prior art relief mechanism structures, the present invention allows for a plurality of independently-operable pressure relief mechanisms. Even the pressure relief mechanism illustrated in FIG. 1, which includes a plurality of spurs, relies upon the inversion of washer 50 for any one of the spurs to penetrate the seal. Each of the plugged apertures provided in the collector assembly of the present invention, however, is not dependent upon one another, and therefore provide for a more reliable pressure relief mechanism as a whole.

As shown in FIG. 6, seal 230 has an upstanding wall 235 formed directly on a peripheral edge of rigid inner cover 210. By providing this upstanding wall 235, a sufficient seal may be created when collector assembly 225 is inserted into can 212. This seal is further enhanced by forming the outer diameter of seal 230 to be greater than the inside diameter of can 212 so that inner cover 210 compresses upstanding wall 235 against the inner surface of can 212.

Seal 230 may additionally be formed to include an extended portion 237 of upstanding wall 235 that extends vertically upward past the upper surface of inner cover 210. By providing extension 237, seal 230 may be used as an electrical insulator between the crimped end 224 of can 212 and a peripheral edge of outer cover 245.

Although seal 230 is shown as including a continuous layer 232 across the entire bottom surface of inner cover 210, it will be appreciated by those skilled in the art that seal 230 need not be formed over the entire bottom surface of inner cover 210, particularly if inner cover 210 is formed of an inert plastic material. Depending upon the characteristics of the materials used to form seal 230 and inner cover 210, a bonding agent may be applied to the surfaces of inner cover 210 that will come into contact and be bonded to seal material 230.

Once seal 230 has been molded to inner cover 210 and collector nail 240 is inserted through central hole 236 of integrated seal/inner cover assembly 228 and through retainer 240, outer cover 245 is placed on the upper surface of collector assembly 225 and is preferably welded to head 242 of collector nail 240. Subsequently, the collector assembly 225 with the outer cover 245 attached thereto is inserted into the open end of cell can 212. To hold collector assembly 225 in place prior to crimping, the bottom surface of collector assembly 225 is rested upon an upper surface 216 of first electrode 215. Thus, collector assembly 225 may be inserted with some degree of force to ensure that the bottom layer 232 of seal 230 rests evenly within the cell can opening on upper surface 216 of electrode 215.

If first electrode 215 is formed by molding it in place within can 212, first electrode 215 is preferably constructed in the manner disclosed in commonly-assigned U.S. patent application Ser. No. 09/036,115 entitled "ELECTROCHEMICAL CELL STRUCTURE EMPLOYING ELECTRODE SUPPORT FOR THE SEAL," filed on Mar. 6, 1998, by Gary R. Tucholski et al. to prevent any flashing resulting from the molding of first electrode 215 from interfering with the proper alignment and seal provided by the collector assembly. The disclosure of U.S. patent application Ser. No. 09/036,115 is incorporated by reference herein.

By resting collector assembly 225 on electrode 215, can 212 could be crimped at its open end so as to provide a downward force that is countered by electrode 215. Thus, the higher profile crimp used in the conventional cell construction shown in FIG. 1 may be replaced with a lower profile crimp, thereby creating about 0.060 inch more space inside the cell.

A collector assembly 225 having the construction shown in FIG. 6 has a much lower profile than the conventional collector assembly as illustrated in FIG. 1. Thus, a cell 200 utilizing collector assembly 225 may include greater amounts of electrochemical materials 215 and 220, and the service life of the cell is increased accordingly. Despite its lower profile, collector assembly 225 nevertheless exhibits sufficient sealing and electrical insulation. Additionally, the collector assembly of the present invention provides a pressure relief mechanism that is not only reliable, but which provides the advantages of multiple independently-operable pressure relief mechanisms and partial resealing after venting to prevent the subsequent leakage of electrochemical materials from the cell. Further, the collector assembly of the present invention offers improved water permeability characteristics, thereby increasing the service maintenance of the battery.

The calculated total volumes (cc) and internal volumes (cc) available for containing electrochemically active materials for batteries of various sizes constructed using the ultra low profile seal shown in FIG. 6, are provided in the table shown in FIG. 14A. As apparent from the table in FIG. 14A, the internal cell volumes for such cells are generally greater than any of the prior commercially-available cells. For example, a D sized battery employing the ultra low profile seal has an internal volume available for containing electrochemically active materials of 45.53 cc, which is 90.9 percent of the total volume of 50.07 cc. This is greater than the internal volume measured on any of the conventional cells listed in FIG. 2A. Further, for cells having a can thickness of 8 mils or 6 mils, the internal cell volume may be further significantly increased. The calculated total volumes (cc) are further shown in the table presented in FIG. 14B, in comparison with the collector assembly volumes for batteries of various sizes constructed using the ultra low profile seal shown in FIG. 6. The collector assembly volume as defined herein includes the collector nail, seal, inner cover, and any void volume between the bottom surface of the negative cover and the seal. The container volume as defined herein includes the volume used by the can, label, negative cover, void volume between the label and the negative cover, positive cover, and the void volume between the positive cover and can. It should be appreciated that the total volume of the battery is equal to the summation of the internal volume available for electrochemically active materials, the collector assembly volume, and the container volume. The total volume of the battery, collector assembly volume and container volume are determined by viewing a CAD drawing of the central longitudinal cross-sectional view of the battery. As is apparent from the table in FIG. 14B, the collector assembly volume is generally less than any of the prior commercially-available cells. It should be appreciated that the collector assembly volume is decreased by using the ultra low profile seal construction. For example, the collector assembly volume consumed in the ultra low profile seal is 1.89 cc, which is 3.8 percent of the total volume of 50.07 cc as shown in FIG. 14B. In contrast, this is less than any of the collector assembly volumes measured from the conventional batteries as listed in FIG. 2B. The container volume may also be decreased. Similarly, for cells having a reduced can thickness of 8 mils or 6 mils, the internal cell volume may be further significantly increased, while the container volume is decreased.

The ultra low profile seal described above, and several alternative embodiments of the ultra low profile seal, are disclosed in commonly-assigned U.S. patent application Ser. No. 09/036,208 entitled "COLLECTOR ASSEMBLY FOR AN ELECTROCHEMICAL CELL INCLUDING AN INTEGRAL SEAL/INNER COVER," filed on Mar. 6, 1998, by Gary R. Tucholski, the disclosure of which is incorporated by reference herein.

Low Profile Seal and Ultra Low Profile Seal With Formed Positive Protrusion

Figure 7:
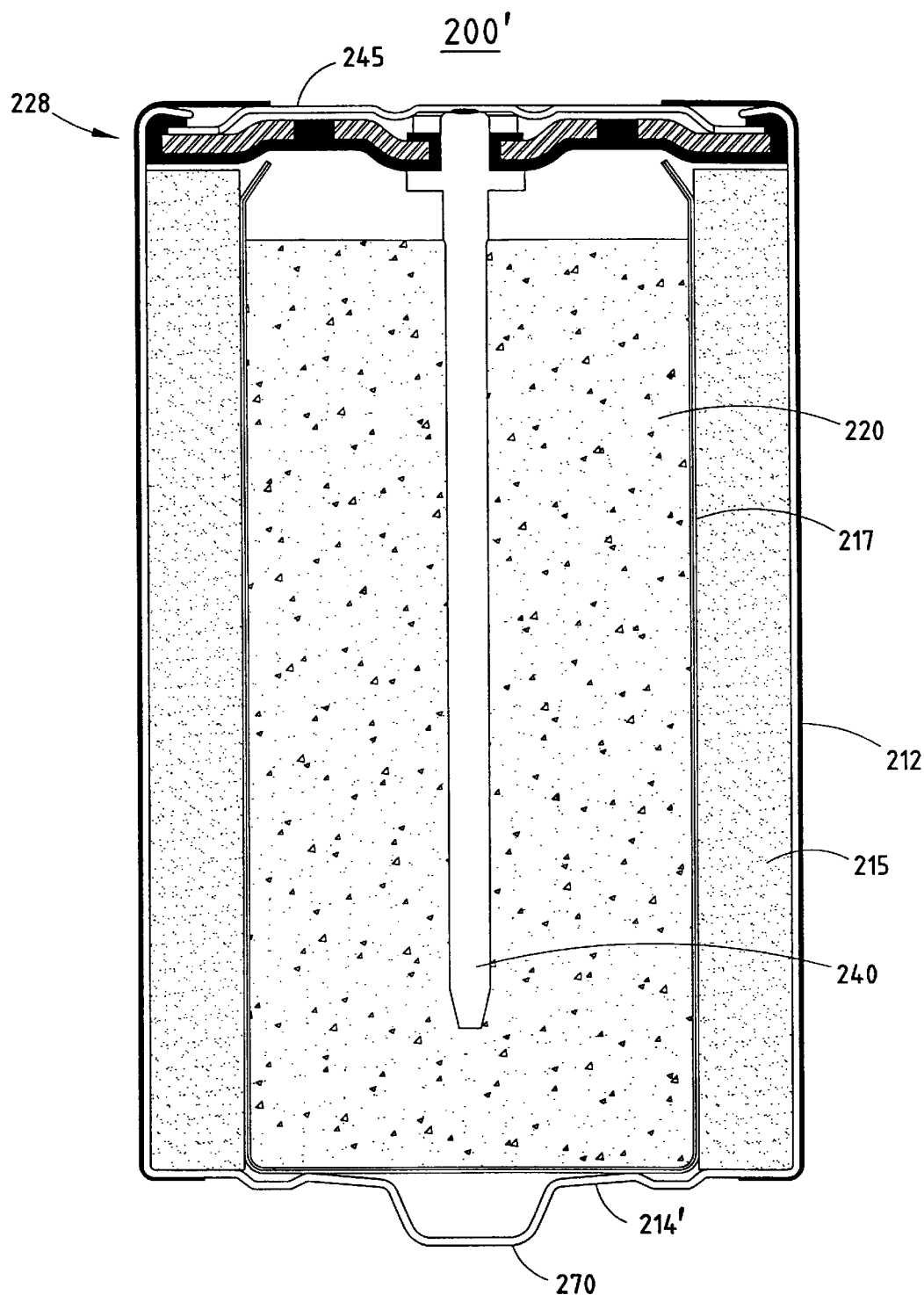
FIG. 7 is a cross section of a C sized alkaline electrochemical cell having an ultra low profile seal and a formed positive cover protrusion according to a third embodiment of the present invention.

As shown in FIG. 7, the second embodiment shown in FIG. 6 may be modified to have the protrusion 270 for the positive battery terminal formed directly in the closed end 214' of can 212. In this manner, the void space existing between the closed end 214 of can 212 and positive outer cover 211 (FIG. 6) may be used to contain electrochemically active materials or otherwise provide space for the collection of gasses, which otherwise must be provided within the cell. It will further be appreciated by those skilled in the art that the first embodiment shown in FIG. 4 may similarly be modified, such that the positive outer cover protrusion is formed directly in the bottom of can 112. Although the increase in cell volume obtained by forming the protrusion directly in the bottom of the can is not provided in the table in FIG. 14A, it will be appreciated by those skilled in the art that the internal volume is typically one percent greater than the volumes listed for the ultra low profile seal or low profile seal listed in the table, which are formed with a separate cover.

Pressure Relief Mechanism Formed in Can Bottom with L-Shaped Seal

Figure 8A:
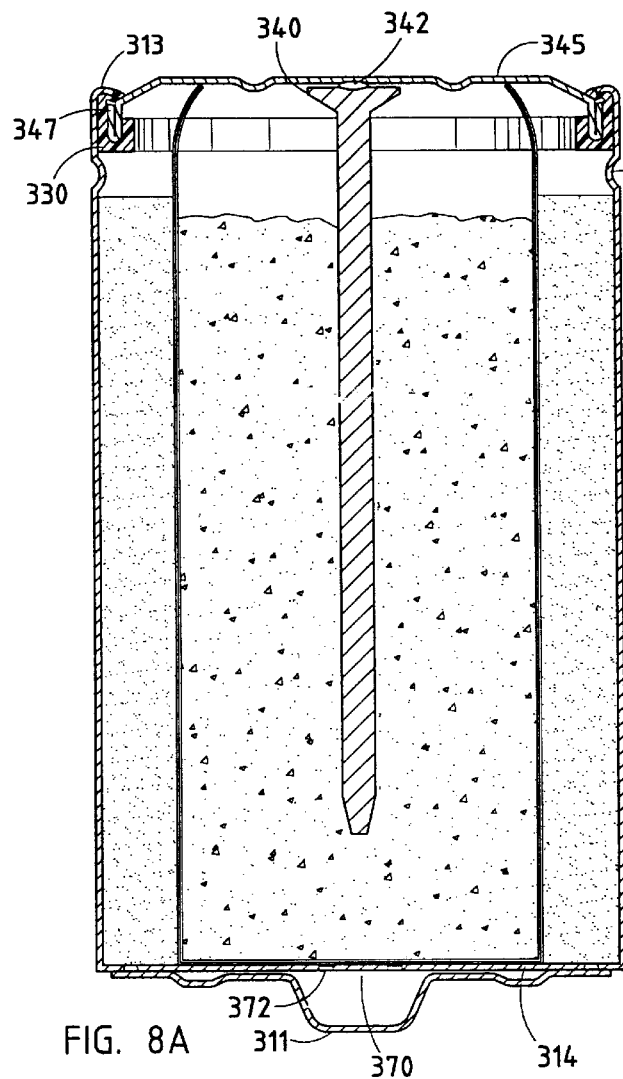
FIG. 8A is a cross section of a C sized alkaline electrochemical cell constructed in accordance with a fourth embodiment of the present invention having a rollback cover, an annular L-shaped or J-shaped seal, and a pressure relief mechanism formed in the can bottom surface.
Figure 8B:
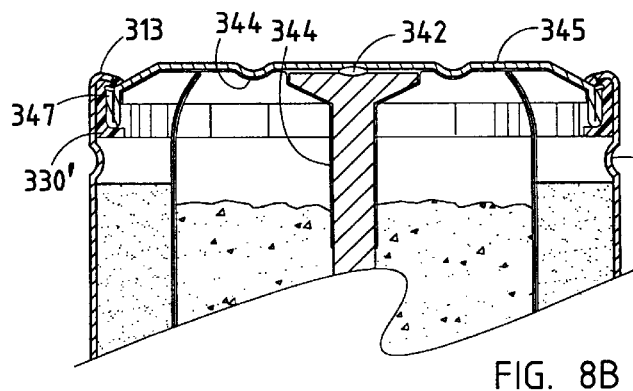
FIG. 8B is a cross section of the top portion of a C sized alkaline electrochemical cell constructed in accordance with the fourth embodiment of the present invention having a rollback cover and further including an L-shaped annular seal.
Figure 8C:
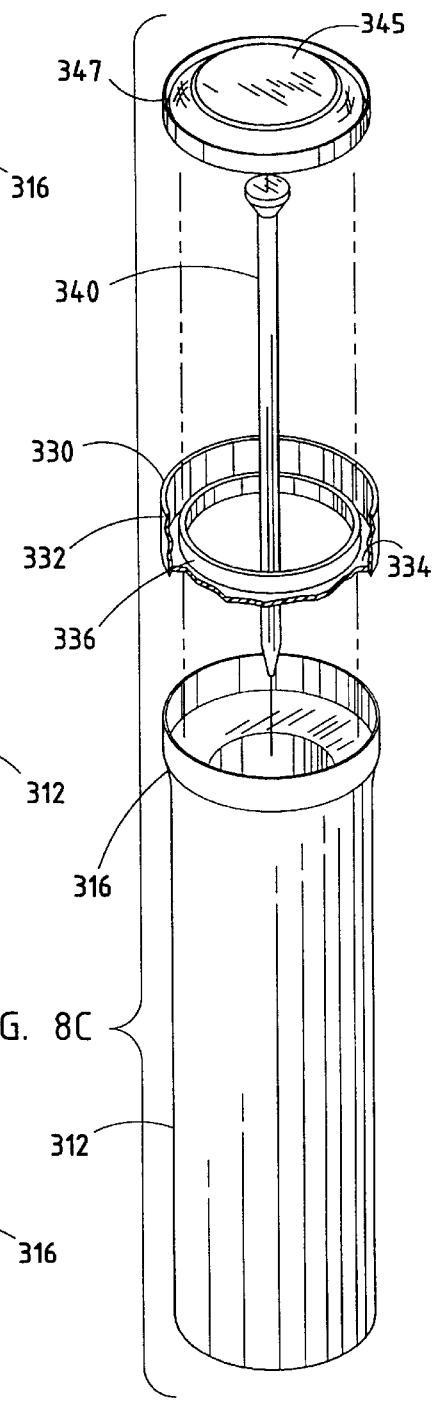
FIG. 8C is an exploded perspective view of the electrochemical cell shown in FIG. 8A illustrating assembly of the collector seal and cover assembly.

An electrochemical battery 300 constructed in accordance with a fourth embodiment of the present invention is shown in FIGS. 8A through 8C. Battery 300 differs from the prior battery constructions in that a pressure relief mechanism 370 is formed in the closed end 314 of can 312. As a result, complex collector/seal assemblies may be replaced with collector assemblies that consume less volume and have fewer parts. Thus, a significant improvement in internal cell volume efficiency may be obtained. As shown in FIGS. 8A, 8B, 9, and 10, the pressure relief mechanism 370 is formed by providing a groove 372 in the bottom surface of can 312. This groove may be formed by coining a bottom surface of can 312, cutting a groove in the bottom surface, or molding the groove in the bottom surface of the can at the time the positive electrode is molded. For an AA sized battery, the thickness of the metal at the bottom of the coined groove is approximately 2 mils. For a D sized battery, the thickness of the metal at the bottom of the coined groove is approximately 3 mils. The groove may be formed as an arc of approximately 300 degrees. By keeping the shape formed by the groove slightly open, the pressure relief mechanism will have an effective hinge.

The size of the area circumscribed by the groove 372 is preferably selected such that upon rupture due to excessive internal pressure, the area within the groove 372 may pivot at the hinge within the positive protrusion of outer cover 311 without interference from outer cover 311. In general, the size of the area defined by the groove 372, as well as the selected depth of the groove, depends upon the diameter of the can and the pressure at which the pressure relief mechanism is to rupture and allow internally-generated gasses to escape.

Unlike pressure relief mechanisms that have been described in the prior art as being formed in the side or end of the can, the pressure relief mechanism 370 of the present invention is positioned beneath outer cover 311 so as to prevent the electrochemical materials from dangerously spraying directly outward from the battery upon rupture. Also, if the battery were used in series with another battery such that the end of the positive terminal of the battery is pressed against the negative terminal of another battery, the provision of outer cover 311 over pressure relief mechanism 370 allows mechanism 370 to bow outwardly under the positive protrusion and ultimately rupture. If outer cover 311 was not present in such circumstances, the contact between the two batteries may otherwise prevent the pressure relief mechanism from rupturing. Further, if outer cover 311 were not provided over pressure relief mechanism 370, the pressure relief mechanism at the positive end of the battery would be more susceptible to damage. Outer cover 311 also shields pressure relief mechanism 370 from the corrosive effects of the ambient environment and therefore reduces the possibility of premature venting and/or leaking. Thus, by forming the pressure relief mechanism under the outer cover, the present invention overcomes the problems associated with the prior art constructions, and thus represents a commercially feasible pressure relief mechanism for a battery.

Because the formation of a pressure relief mechanism in the bottom surface of a battery can eliminates the need for a complex collector/seal assembly, the open end of the battery can may be sealed using construction techniques that were not previously feasible due to the need to allow gasses to escape through the pressure relief mechanism to the exterior of the battery. For example, as shown in FIGS. 8A and 8B, the open end of can 312 may be sealed by placing either a nylon seal 330 having a J-shaped cross section or a nylon seal 330' having an L-shaped cross section in the open end of can 312, inserting a negative outer cover 345 having a rolled back peripheral edge 347 within nylon seal 330 or 330', and subsequently crimping the outer edge 313 of can 312 to hold seal 330 or 330' and cover 345 in place. To help hold seal 330 or 330' in place, a bead 316 may be formed around the circumference of the open end of can 312. Nylon seal 330 or 330' may be coated with asphalt to protect it from the electrochemically active materials and to provide a better seal.

Referring particularly to FIGS. 8A and 8C, the annular nylon seal 330 is shown configured with a J-shaped cross section which includes an extended vertical wall 332 at the outermost perimeter thereof, a shorter vertical wall 336 at the radially inward side of the seal and has a horizontal base member 334 formed between the vertical walls 332 and 336. With the presence of the short vertical section 336, the annular seal is referred to herein as having either a J-shaped or L-shaped cross section. It should be appreciated that the J-shaped nylon seal 330 could also be configured absent the short vertical section 336 to form a plain L-shaped cross section as shown in FIG. 8B.

With particular reference to FIG. 8C, the assembly of the electrochemical cell shown in FIG. 8A is illustrated therein. The cylindrical can 312 is formed with side walls defining the open end and bead 316 for receiving internally disposed battery materials prior to closure of the can. Disposed within can 312 are the active electrochemical cell materials including the positive and negative electrodes and the electrolyte, as well as the separator, and any additives. Together, the outer cover 345, with the collector nail 340 welded or otherwise fastened to the bottom surface of cover 345, and annular nylon seal 330 are assembled and inserted into the open end of can 312 to seal and close can 312. The collector nail 340 is preferably welded via spot weld 342 to the bottom side of outer cover 345. Together, collector nail 340 and cover 345 are engaged with seal 330 to form the collector assembly, and the collector assembly is inserted in can 312 such that the rolled back peripheral edge 347 of outer cover 345 is disposed against the inside wall of annular seal 330 above bead 316 which supports seal 330. The collector assembly is forcibly disposed within the open end of can 312 to snuggly engage and close the can opening. Thereafter, the outer edge 313 of can 12 is crimped inward to axially force and hold seal 330 and outer cover 345 in place.

Referring back to FIG. 8B, the inside surface of outer cover 345 and at least a top portion of collector nail 340 are further shown coated with an anti-corrosion coating 344. Anti-corrosion coating 344 includes materials that are electrochemically compatible with the anode. Examples of such electrochemically compatible materials include epoxy, Teflon®, polyolefins, nylon, elastomeric materials, or any other inert materials, either alone or in combination with other materials. Coating 344 may be sprayed or painted on and preferably covers that portion of the inside surface of outer cover 345 and collector nail 340 which is exposed to the active materials in the void region above the positive and negative electrodes of the cell. It should also be appreciated that the inside surface of cover 345 could be plated with tin, copper, or other similarly electrochemically compatible materials. By providing the anti-corrosion coating 344, any corrosion of the outer cover 345 and collector nail 340 is reduced and/or prevented, which advantageously reduces the amount of gassing which may otherwise occur within the electrochemical cell. Reduction in gassing within the cell results in reduced internal pressure buildup.

As shown in FIG. 14A in the rows referenced "Pressure Relief in Can Bottom" and "Pressure Relief in Can Bottom With Thin Walls," a D sized battery constructed using the construction shown in FIG. 8A, has an internal volume that is 93.5 volume percent when the can walls are 10 mils thick, and an internal volume that is 94.9 volume percent when the can walls are 8 mils thick. As shown in FIG. 14B, a D sized battery constructed using the construction shown in FIG. 8A, has a collector assembly volume that is 2 percent of the total volume when the can walls are 10 mils thick and 8 mils thick. The C, AA, and AAA sized batteries having similar construction also exhibited significant improvements in internal volume efficiency, as is apparent from the table in FIGS. 14A.

Beverage Can-Type Construction

Figure 11:
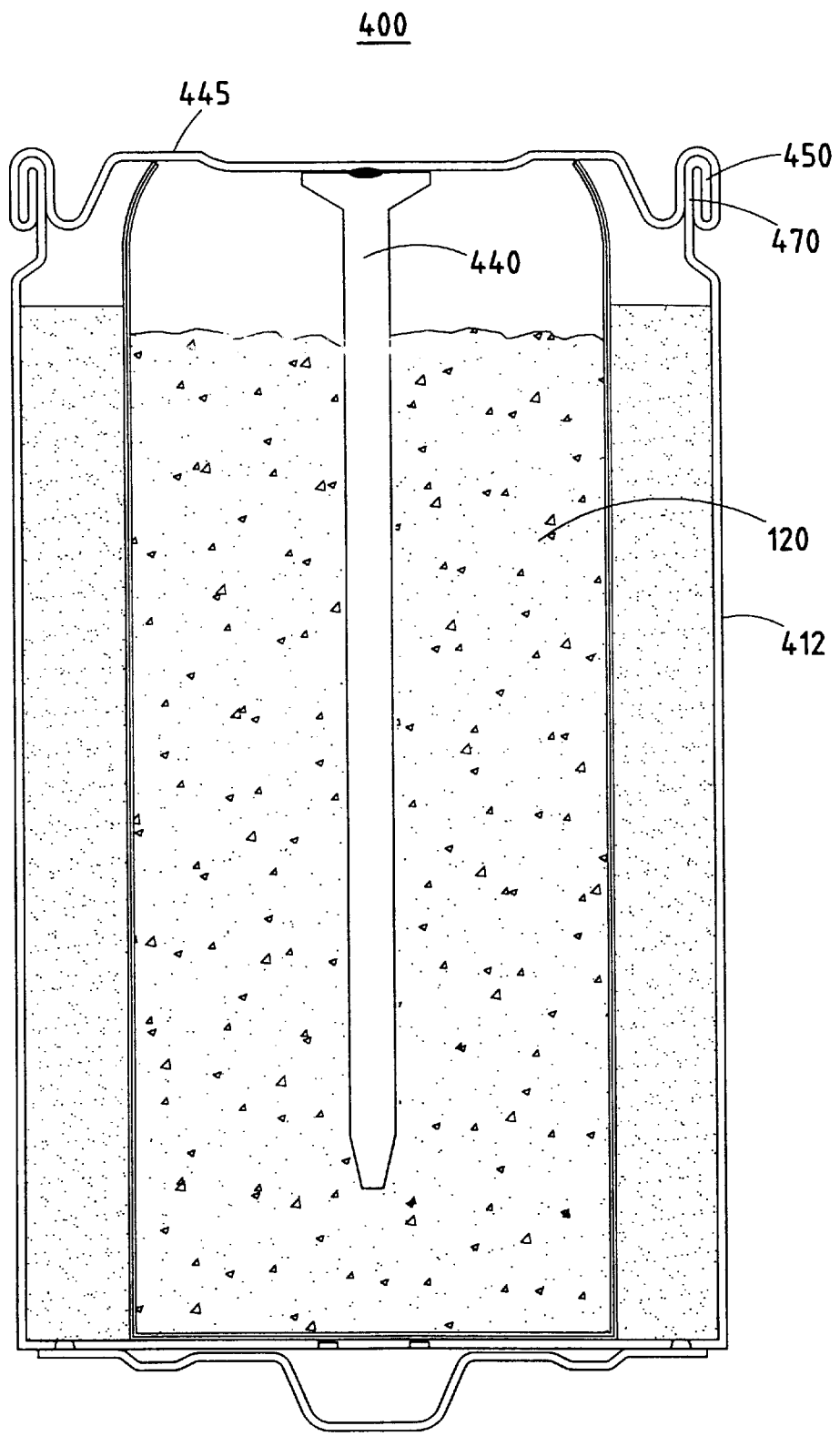
FIG. 11 is a cross section of a C sized alkaline electrochemical cell having a beverage can-type construction according to a fifth embodiment of the present invention.

The use of the pressure relief mechanism illustrated in FIGS. 8A–10, further allows the use of the beverage can-type construction shown in FIG. 11. The beverage can-type construction shown differs from other forms of battery seal constructions in that it does not require any form of nylon seal to be inserted into the open end of can 412. Instead, negative outer cover 445 is secured to the open end of can 412 using a sealing technique commonly used to seal the top of a food or beverage can to the cylindrical portion of the can. Such sealing constructions had not previously been considered for use in sealing batteries because they would not readily allow for the negative outer cover to be electrically insulated from the can.

The method of making a battery having the construction shown in FIG. 11 is described below with reference to FIGS. 12A–12D. Prior to attaching negative outer cover 445 to the open end of can 412, a collector nail 440 is welded to the inner surface of cover 445. Next, as shown in FIG. 12A, the inner surface of cover 445, as well as the peripheral portion of the upper surface of cover 445, is coated with a layer 475 of electrical insulation material, such as an epoxy, nylon, Teflon®, or vinyl. The portion of collector nail 440 that extends within the void area between the bottom of cover 445 and the top surface of the negative electrode/electrolyte mixture 120, is also coated with the electrical insulation. Additionally, the inner and outer surfaces of can 412 are also coated in the region of the open end of can 412. Such coatings 475 may be applied directly to the can and cover by spraying, dipping, or electrostatic deposition. By providing such a coating, negative outer cover 445 may be electrically insulated from can 412.

By applying the insulation coating to the areas of the can, cover, and collector nail within the battery that are proximate the void area within the battery's internal volume, those areas may be protected from corrosion. While a coating consisting of a single layer of the epoxy, nylon, Teflon®, or vinyl materials noted above will function to prevent such corrosion, it is conceivable that the coating may be applied using layers of two different materials or made of single layers of different materials applied to different regions of the components. For example, the peripheral region of the cover may be coated with a single layer of material that functions both as an electrical insulator and an anti-corrosion layer, while the central portion on the inner surface of the cover may be coated with a single layer of a material that functions as an anti-corrosion layer but does not also function as an electrical insulator. Such materials may include, for example, asphalt or polyamide. Alternatively, either one of the can or cover may be coated with a material that functions as both an electrical insulator and anti-corrosion layer, while the other of these two components may be coated with a material that functions only as an anti-corrosion layer. In this manner, the electrical insulation would be provided where needed (i.e., between the cover/can interface), while the surfaces partially defining the void area in the internal volume of the cell will still be protected from the corrosive effects of the electrochemical materials within the cell. Further, by utilizing different materials, materials may be selected that are lower in cost or exhibit optimal characteristics for the intended function.

To assist in the sealing of outer cover 445 to can 412, a conventional sealant 473 may be applied to the bottom surface of peripheral edge 470 of cover 445. Once the sealing procedure is complete, sealant 473 migrates to the positions shown in FIG. 12D.

Once collector nail 440 has been attached to outer cover 445 and the electrical insulation coating has been applied, outer cover 445 is placed over the open end of can 412 as shown in FIG. 12B. Preferably, can 412 has an outward extending flange 450 formed at its open end. Further, outer cover 445 preferably has a slightly curved peripheral edge 470 that conforms to the shape of flange 450. Once outer cover 445 has been placed over the open end of can 412, a seaming chuck 500 is placed on outer cover 445, such that an annular downward extending portion 502 of seaming chuck 500 is received by an annular recess 472 formed in outer cover 445. Next, a first seaming roll 510 is moved in a radial direction toward the peripheral edge 470 of outer cover 445. As first seaming roll 510 is moved toward peripheral edge 470 and flange 450, its curved surface causes peripheral edge 470 to be folded around flange 450. Also, as first seaming roll 510 moves radially inward, seaming chuck 500, can 412, and outer cover 445 are rotated about a central axis, such that peripheral edge 470 is folded around flange 450 about the entire circumference of can 412. Further, as first seaming roll 510 continues to move radially inward, flange 450 and peripheral edge 470 are folded downward to the position shown in FIG. 12C.

After peripheral edge 470 and flange 450 have been folded into the position shown in FIG. 12C, first seaming roll 510 is moved away from can 412, and a second seaming roll 520 is then moved radially inward toward flange 450 and peripheral edge 470. Second seaming roll 520 has a different profile than first seaming roll 510. Second seaming roll 520 applies sufficient force against flange 450 and peripheral edge 470 to press and flatten the folded flange and peripheral edge against the exterior surface of can 412, which is supported by seaming chuck 500. As a result of this process, the peripheral edge 470 of can 412 is folded around and under flange 450 and is crimped between flange 450 and the exterior surface of the walls of can 412, as shown in FIGS. 11 and 12D. A hermetic seal is thus formed by this process.

To illustrate the hermetic nature of this type of seal, a D sized can constructed in accordance with this embodiment of the present invention was filled with water as was a D sized can constructed with a conventional seal, such as that illustrated in FIG. 1. The two cans were maintained at 71° C. and weighed over time to determine the amount of water lost from the cans. The conventional construction lost 270 mg per week, and the construction in accordance with the present invention did not lose any weight over the same time period. These results were confirmed using KOH electrolyte, with the conventional construction losing 50 mg per week and the inventive construction again not losing any weight.

As will be apparent to those skilled in the art, the beverage can-type construction utilizes minimal space in the battery interior, reduces the number of process steps required to manufacture a battery, and significantly reduces the cost of materials and the cost of the manufacturing process. Further, the thickness of the can walls may be significantly reduced to 6 mils or less. As a result, the internal volume available for containing the electrochemically active materials may be increased. For example, for a D sized battery, the percentage of the total battery volume that may be used to contain the electrochemically active materials may be as high as 97 volume percent, while collector assembly volume may be as low as 1.6 volume percent. The volumes of batteries of other sizes are included in the table shown in FIGS. 14A and 14B.

By utilizing the inventive sealing constructions, not only can the can wall thickness be decreased, but also the number of possible materials used to form the can may be increased due to the lessened strength requirements that must be exhibited by the can. For example, the inventive constructions noted above may enable aluminum or plastics to be used for the can rather than the nickel-plated steel currently used.

Figure 13:
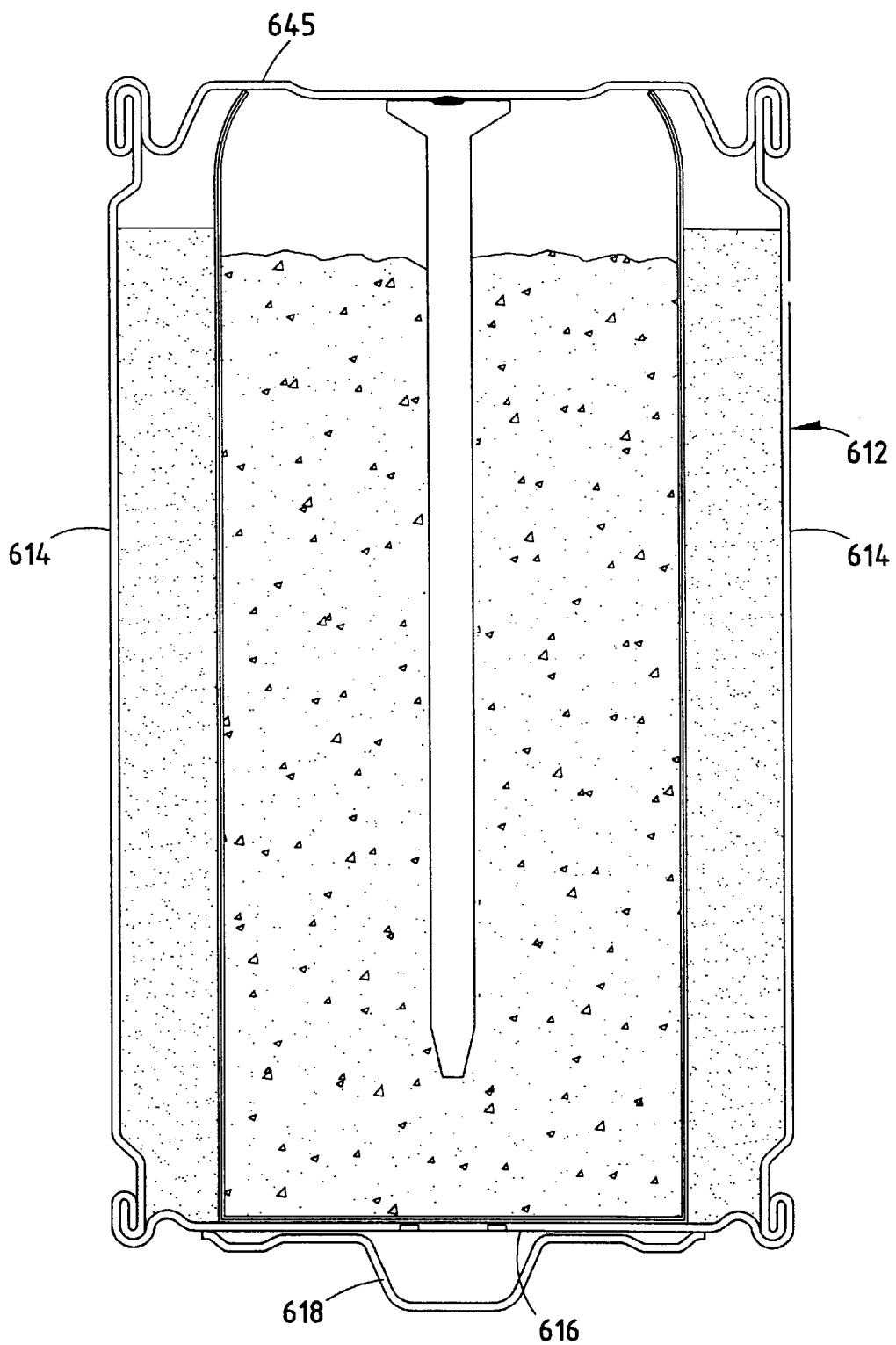
FIG. 13 is a cross section of a C sized alkaline electrochemical cell having a beverage can-type construction according to a sixth embodiment of the present invention.

A variation of the beverage can construction is shown in FIG. 13. In the illustrated embodiment, the battery can is first formed as a tube with two open ends. The tube may be extruded, seam welded, soldered, cemented, etc., using conventional techniques. The tube may be formed of steel, aluminum, or plastic. As shown in FIG. 13, the tube defines the side walls 614 of can 612. A first open end of the tube is then sealed by securing an inner cover 616 thereto using the beverage can sealing technique outlined above, with the exception that no electrical insulation is required between inner cover 616 and side walls 614. A positive outer cover 618 may be welded or otherwise secured to the outer surface of inner cover 616. The battery may then be filled and a negative outer cover 645 may be secured to the second open end of can 612 in the same manner as described above.

Printed Label on Can

As noted above, the inventive battery constructions may be used in combination with a printed label, rather than the label substrates currently used. Current label substrates have thicknesses on the order of 3 mils. Because such label substrates overlap to form a seam running along the length of the battery, these conventional labels effectively add about 10 mils to the diameter and 13 mils to the crimp height of the battery. As a result, the battery can must have a diameter that is selected to accommodate the thickness of the label seam in order to meet the ANSI size standards. However, by printing a lithographed label directly on the exterior surface of the can in accordance with the present invention, the diameter of the can may be correspondingly increased approximately 10 mils. Such an increase in the diameter of the can significantly increases the internal volume of the battery. All of the batteries listed in the tables of FIGS. 14A and 14B, with the exception of the beverage can constructions, include substrate labels. The internal volume of the batteries with substrate labels can be further increased 2 percent (1.02 cc) for a D sized battery, 2.6 percent (0.65 cc) for a C sized battery, 3.9 percent (0.202 cc) for an AA sized cell, and 5.5 percent (0.195 cc) for an AAA sized battery, if the labels were printed directly on the exterior of the can. Labels may also be printed on the can using transfer printing techniques in which the label image is first printed on a transfer medium and then transferred directly onto the can exterior. Distorted lithography may also be used whereby intentionally distorted graphics are printed on flat material so as to account for subsequent stress distortions of the flat material as it is shaped into the tube or cylinder of the cell can.

Prior to printing the lithographed label, the exterior surface of the can is preferably cleaned. To enhance adherence of the print to the can, a base coat of primer may be applied to the exterior surface of the can. The printed label is then applied directly on top of the base coat on the can by known lithography printing techniques. A varnish overcoat is preferably applied over the printed label to cover and protect the printed label, and also to serve as an electrical insulating layer. The printed label may be cured with the use of high temperature heating or ultraviolet radiation techniques.

With the use of the printed label, the thickness of a conventional label substrate is significantly reduced to a maximum thickness of approximately 0.5 mil. In particular, the base coat layer has a thickness in the range of about 0.1 to 0.2 mil, the print layer has a thickness of approximately 0.1 mil, and the varnish overcoat layer has a thickness in the range of about 0.1 to 0.2 mil. By reducing the label thickness, the can can be increased in diameter, thereby offering an increase in available volume for active cell materials while maintaining a predetermined outside diameter of the battery.

Beverage Can With Feed Through Collector

Referring to FIG. 15, an electrochemical cell 700 is shown constructed with a feed through collector according to a seventh embodiment of the present invention. Similar to the electrochemical cell 400 with beverage can-type construction shown in FIG. 11, electrochemical cell 700 includes an electrically conductive can 712 having a closed end 314 and an open end in which a low volume collector assembly 725 and outer negative cover 750 are assembled. Electrochemical cell 700 includes a positive electrode 115 in contact with the interior walls of can 712 and in contact with a separator 117 that lies between a positive electrode 115 and a negative electrode 120. The positive electrode 115 is also referred to herein as the cathode, while the negative electrode 120 is also referred to herein as the anode. It should be appreciated that the type of materials and their location internal to the electrochemical cell may vary without departing from the teachings of the present invention.

Electrochemical cell 700 also includes a pressure relief mechanism 370 formed in the closed end 314 of can 712. This allows for employment of the low volume collector assembly 725 which consumes less volume than conventional collector assemblies, and therefore achieves enhanced internal cell volume efficiency. The pressure relief mechanism 370 may be formed as a groove as described herein in connection with FIGS. 8A, 8B, 9, and 10. In addition, a positive outer cover 311 is connected to the closed end of can 712 and overlies the pressure relief mechanism 370. The assembly and location of positive outer cover 311 is provided as shown and described herein in connection with FIG. 8A.

Electrochemical cell 700 includes a collector assembly 725 which closes and seals the open end of can 712. Collector assembly 725 includes a collector nail 740 disposed in electrical contact with the negative electrode 120. Also included in the collector assembly 725 is a first or inner cover 745 having a central aperture 751 formed therein. The collector nail 740 is disposed and extends through the aperture 751 in inner cover 745. A dielectric insulating material 744 is disposed between collector nail 740 and first cover 745 to provide dielectric insulation therebetween. Accordingly, the collector nail 740 is electrically isolated from inner cover 745. Dielectric insulating material 744 is an organic macromolecular material, such as an organic polymer, and may include an epoxy, rubber, nylon, or other dielectric material that is resistant to attack by KOH and is non-corrosive in the presence of potassium hydroxide in an alkaline cell. The dielectric insulating material is assembled as explained hereinafter.

Inner cover 745 in turn is connected and sealed to the open top end of can 712. Inner cover 745 may be inserted into can 712 and sealed to can 712 by forming a double seam closure at the peripheral edges 450 and 470 as explained herein in connection with FIGS. 11–13. While a double seam can-to-cover closure is shown in connection with the seventh embodiment of the present invention, it should be appreciated that other can-to-cover closures may be employed, without departing from the teachings of the present invention.

The electrochemical cell 700, according to the seventh embodiment allows for a direct connection between can 712 and inner cover 745, which preferably provides a pressure seal therebetween, but does not require electrical isolation between inner cover 745 and the side walls of can 712. Instead, the collector nail 740 is dielectically insulated from inner cover 745 such that the negative and positive terminals of the electrochemical cell are electrically isolated from one another. While there is no requirement of maintaining electrical isolation between the can 712 and inner cover 745, it is preferred that a sealant be applied at the closure joining the can to the cover to adequately seal the can. A suitable sealant may be applied as explained in connection with the battery shown and described herein in connection with FIGS. 11–12D. It should be appreciated that the sealed closure along with the insulating material should be capable of withstanding internal pressure buildup greater than the venting pressure at which pressure release mechanism 370 releases pressure.

To provide an acceptable outer battery terminal in accordance with well accepted battery standards, the electrochemical cell 700 further includes an outer cover 750 in electrical contact with collector nail 740. Outer cover 750 may be welded by spot weld 742 or otherwise electrically connected to collector nail 740. To insure proper electrical insulation between outer cover 750 and inner cover 745, a dielectric material such as annular pad 748 is disposed between outer negative cover 750 and inner cover 745. Suitable dielectric materials may include nylon, other elastomeric materials, rubber, and epoxy applied on the top surface of inner cover 745 or on the bottom surface of outer cover 750. Accordingly, an acceptable standard battery terminal may be provided at the negative end of electrochemical cell 700.

The assembly of electrochemical cell 700 according to the seventh embodiment of the present invention is illustrated in the assembly view of FIG. 16 and is further illustrated in the flow diagram of FIG. 17. The method 770 of assembly of electrochemical cell 700 includes providing can 712 formed with a closed bottom end and open top end. Step 774 includes disposing into can 712 the active electrochemical materials including the negative electrode, the positive electrode, and an electrolyte, as well as the separator and other cell additives. Once the active electrochemical cell materials are disposed within can 712, can 712 is ready for closure and sealing with the collector assembly 725. Prior to closing the can, the collector assembly is assembled by first disposing the collector nail 740 within aperture 751 formed in inner cover 745 along with a ring of insulating material according to step 776. Collector nail 740 is disposed in the opening 742 of insulating ring 744 which may include a ring or disk of epoxy which provides dielectric insulation and can be heated to reform and settle between the inner cover 745 and collector nail 740. Alternately, other organic macromolecular dielectric insulation materials may be used in place of epoxy, such as a rubber grommet, an elastomeric material, or other dielectric materials that may form adequate insulation between collector nail 740 and inner cover 745. Also shown formed in inner cover 745 is a recess 755 formed in the top surface and centered about aperture 751.

According to the preferred embodiment, ring 744 of insulating material is disposed in recess 755 on top of inner cover 745 and the top head of collector nail 740 is disposed thereabove. In step 778, the insulating ring 744 is assembled to collector nail 740 and cover 745 and the insulating ring 744 is heated to a temperature sufficiently high enough to melt ring 744 such that ring 744 reforms and flows into the aperture 751 in cover 745 to provide continuous dielectric insulation between collector nail 740 and inner cover 745. For a ring 744 made of epoxy, a temperature of 20° C. to 200° C. for a time of a few seconds to twenty-four hours may be adequate to reform and cure the insulating material. Once dielectric material 744 forms adequate insulation between collector nail 740 and inner cover 745, the insulated material is preferably cooled in step 780. During the heating and cooling steps 778 and 780, the collector nail 740 is centered in aperture 751 such that nail 740 does not contact cover 745. Thereafter, in step 782, an electrical dielectric insulating pad 748 such as an annular dielectric pad is disposed on top of inner cover 745 and extends radially outward from the perimeter of nail 740. In step 784, disposed on top of collector nail 740 and pad 748 is a conductive negative cover 750 which is welded or otherwise formed in electrical contact with collector nail 740. Once the collector assembly is fully assembled, the collector assembly is then connected to the can to sealingly close the open end as provided in step 786. Can closure may employ a double seam closure or other suitable can closure technique. In addition, the assembly method 770 includes step 788 of connecting a second outer cover to the closed end of the can, preferably overlying the pressure relief mechanism 370.

While the present invention has been described above as having primary applicability to alkaline batteries, it will be appreciated by those skilled in the art that similar benefits may be obtained be employing the inventive constructions in batteries utilizing other electrochemical systems. For example, the inventive constructions may be employed in primary systems such as carbon-zinc and lithium based batteries and in rechargeable batteries, such as NiCd, metal hydride, and Li based batteries. Further, certain constructions of the present invention may be used in raw cells (i.e., cells without a label as used in battery packs or multi-cell batteries). Additionally, although the present invention has been described above in connection with cylindrical batteries, certain constructions of the present invention may be employed in constructing prismatic cells.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A battery comprising:
   a can for containing electrochemically active materials including positive and negative electrodes and an electrolyte, said can having a first end, an open second end, side walls extending between said first and second ends, and an end wall extending across said first end;
   a pressure relief mechanism formed in said end wall of said can for releasing internal pressure from within said can when the internal pressure becomes excessive;
   a first outer cover positioned on said end wall of said can to be in electrical contact therewith and to extend over said pressure relief mechanism;

a second outer cover positioned across the open second end of said can; and an insulator disposed between said can and said second outer cover for electrically insulating said can from said second outer cover, wherein said first outer cover includes a protrusion extending over and spaced from said pressure relief mechanism, and the protrusion provides an open space over said pressure relief mechanism so that said first outer cover does not interfere with said pressure relief mechanism.

2. The battery as defined in claim 1, wherein said insulator is a coating of insulating material deposited on at least one of said can and said second outer cover.

3. The battery as defined in claim 1, wherein said end wall is integrally formed with said side walls of said can.

4. The battery as defined in claim 1, wherein said can is formed as a tube with said end wall secured across said first end.

5. The battery as defined in claim 1, wherein said pressure relief mechanism is formed by coining a surface of said end wall of said can.

6. The battery as defined in claim 1, wherein said pressure relief mechanism includes an arc-shaped groove formed in a surface of said end wall of said can.

7. The battery as defined in claim 6, wherein said arc-shaped groove is formed as a 300 degree partial circle.

8. The battery as defined in claim 1, wherein said first outer cover is electrically coupled to said positive electrode to serve as a positive external battery terminal and said second outer cover is electrically coupled to said negative electrode to serve as a negative external battery terminal.

9. The battery as defined in claim 8 wherein said first outer cover includes a centrally disposed contact terminal protrusion, and wherein said pressure relief mechanism is formed in said end wall of said can in a region underlying said protrusion.

10. The battery as defined in claim 1, wherein said pressure relief mechanism includes a hinged portion that pivots out from said end wall of said can upon rupture.

11. A battery comprising:

a container containing electrochemically active materials including positive and negative electrodes and an electrolyte, said container having an open end, a closed end, and side walls extending between the open and closed ends;

a pressure relief mechanism formed in the closed end of said container for releasing internal pressure from within said container when the internal pressure becomes excessive;

a first outer cover positioned on said closed bottom end of said container and extending over said pressure relief mechanism; and a second outer cover positioned across said open end of said container, wherein said first outer cover includes a centrally disposed contact terminal protrusion, said pressure relief mechanism is formed in said closed end of said container in a region underlying said protrusion, said centrally disposed contact terminal is spaced from said pressure relief mechanism, and said protrusion provides an open space over said pressure relief mechanism so that said first outer cover does not interfere with said pressure relief mechanism.

12. The battery as defined in claim 11, wherein said container comprises a conductive can, said first and second outer covers comprise conductive material, and an insulator is disposed between said can and said second outer cover for electrically insulating said can from said second outer cover.

13. The battery as defined in claim 11, wherein said pressure relief mechanism includes an arc-shaped groove formed in said bottom end of said container.

14. A method of assembling a battery comprising the steps of:

forming a can having an open end and a closed end;

forming a pressure relief mechanism by forming a groove in a surface of the closed end of the can;

forming a first outer cover and a second outer cover;

dispensing electrochemically active materials in the can;

sealing the first outer cover across the open end of the can; and attaching the second outer cover to the closed end of the can such that the second outer cover extends over the pressure relief mechanism.

15. The method of claim 14, wherein said step of sealing including providing a layer of electrical insulation provided between.

* * * * *